(12) United States Patent
Haishima

(10) Patent No.: US 11,361,615 B2
(45) Date of Patent: Jun. 14, 2022

(54) INFORMATION MANAGEMENT SYSTEM AND INFORMATION PROCESSING DEVICE

(71) Applicant: Universal Entertainment Corporation, Tokyo (JP)

(72) Inventor: Jun Haishima, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/595,615

(22) Filed: Oct. 8, 2019

(65) Prior Publication Data
US 2020/0118387 A1    Apr. 16, 2020

(30) Foreign Application Priority Data

Oct. 16, 2018  (JP) .............................. JP2018-194781

(51) Int. Cl.
*G07F 17/32* (2006.01)
*G06K 7/00* (2006.01)
*G06Q 30/02* (2012.01)

(52) U.S. Cl.
CPC ....... *G07F 17/3227* (2013.01); *G06K 7/0013* (2013.01); *G06Q 30/0209* (2013.01)

(58) Field of Classification Search
None
See application file for complete search history.

(56) References Cited

U.S. PATENT DOCUMENTS

| | | | | |
|---|---|---|---|---|
| 5,971,271 A | * | 10/1999 | Wynn | G07F 17/32 235/380 |
| 6,612,928 B1 | * | 9/2003 | Bradford | G06F 21/31 463/29 |
| 2002/0111210 A1 | * | 8/2002 | Luciano, Jr. | G07F 17/3239 463/29 |
| 2003/0003988 A1 | * | 1/2003 | Walker | G07F 17/3225 463/21 |
| 2005/0059482 A1 | * | 3/2005 | Hedrick | G07F 17/32 463/29 |
| 2005/0227760 A1 | * | 10/2005 | Vlazny | G06Q 50/34 463/28 |
| 2006/0183541 A1 | * | 8/2006 | Okada | G07F 17/32 463/29 |
| 2006/0205496 A1 | * | 9/2006 | Fujimoto | G07F 17/3244 463/29 |

(Continued)

FOREIGN PATENT DOCUMENTS

JP        2013183927 A  *  9/2013
WO     WO-2013133416 A1  *  9/2013  ......... G07F 17/3237

*Primary Examiner* — Tramar Harper
(74) *Attorney, Agent, or Firm* — United IP Counselors, LLC; Kenneth Fagin

(57) ABSTRACT

An information management system includes a gaming machine and an information processing device configured to communicate with the gaming machine, wherein the information processing device manages gaming machine identification information of the gaming machine to which an information card is used as time series information associated with information card identification information based upon the information card identification information of the information card not associated with personal information and the gaming machine identification information unique to the gaming machine transmitted from the gaming machine.

6 Claims, 12 Drawing Sheets

(56) References Cited

U.S. PATENT DOCUMENTS

| | | | |
|---|---|---|---|
| 2007/0060326 A1* | 3/2007 | Juds | G07F 17/3239 463/29 |
| 2007/0094721 A1* | 4/2007 | Nguyen | G07F 17/32 726/9 |
| 2008/0000750 A1* | 1/2008 | Ueda | G07F 17/3283 194/217 |
| 2008/0076528 A1* | 3/2008 | Nguyen | G07F 17/32 463/25 |
| 2008/0214310 A1* | 9/2008 | Brunet De Courssou | G07F 17/323 463/42 |
| 2008/0248878 A1* | 10/2008 | Yoshioka | G07F 17/32 463/42 |
| 2009/0118002 A1* | 5/2009 | Lyons | G06Q 30/0255 463/29 |
| 2009/0124376 A1* | 5/2009 | Kelly | G07F 17/3239 463/29 |
| 2010/0056260 A1* | 3/2010 | Fujimoto | G07F 17/3244 463/25 |
| 2011/0124405 A1* | 5/2011 | Okada | G07D 7/12 463/43 |
| 2012/0115571 A1 | 5/2012 | Kitamura et al. | |
| 2012/0115586 A1* | 5/2012 | Okada | G07F 17/3206 463/25 |
| 2012/0220378 A1* | 8/2012 | Okada | G07F 17/3206 463/42 |
| 2012/0315978 A1* | 12/2012 | LeMay | G07F 17/3239 463/25 |
| 2014/0221083 A1* | 8/2014 | Okada | G07F 17/3237 463/25 |
| 2015/0157930 A1* | 6/2015 | Emori | A63F 13/213 463/36 |
| 2017/0053487 A1* | 2/2017 | Takeda | G07F 17/3211 |
| 2017/0053488 A1* | 2/2017 | Takeda | G07F 17/3211 |
| 2017/0256122 A1* | 9/2017 | Takeda | G07F 17/323 |
| 2017/0256131 A1* | 9/2017 | Takeda | G07F 17/3237 |
| 2017/0278349 A1* | 9/2017 | Takeda | G07F 17/3227 |
| 2017/0287275 A1* | 10/2017 | Takeda | G07F 17/3255 |
| 2018/0225920 A1* | 8/2018 | Kukita | G07F 17/3239 |
| 2019/0164384 A1* | 5/2019 | Soukup | G07F 17/323 |
| 2019/0304253 A1* | 10/2019 | Dabrowski | G07F 17/3239 |

* cited by examiner

FIG.8A

| SLOT MACHINE IDENTIFICATION INFORMATION (0010) |||||
|---|---|---|---|---|
| INFORMATION CARD IDENTIFICATION INFORMATION (0001): CONTINUOUS USE "0" |||||
| DATE | INSERTED AMOUNT | GAME RESULT | BALANCE | NUMBER OF PAYOUTS |
| 20180801 10:00 | 1000 | ○○○ | 100 | — |
| 20180801 10:05 | — | △△△ | 1300 | — |
| 20180801 10:30 | 1000 | △△△ | 200 | — |
| ⋮ | ⋮ | ⋮ | ⋮ | ⋮ |
| 20180801 11:00 | 1000 | ○○○ | 100 | 100 |

FIG.8B

| SLOT MACHINE IDENTIFICATION INFORMATION (0011) |||||
|---|---|---|---|---|
| INFORMATION CARD IDENTIFICATION INFORMATION (0001): CONTINUOUS USE "1" |||||
| DATE | INSERTED AMOUNT | GAME RESULT | BALANCE | NUMBER OF PAYOUTS |
| 20180801 11:30 | 1000 | △△△ | 1500 | — |
| ⋮ | ⋮ | ⋮ | ⋮ | ⋮ |
| 20180801 12:00 | — | ○○○ | 100 | 100 |

FIG.9

| INFORMATION CARD IDENTIFICATION INFORMATION (0001) | | | | | |
|---|---|---|---|---|---|
| DATE | INSERTED AMOUNT | GAME RESULT | BALANCE | NUMBER OF PAYOUTS | SLOT MACHINE IDENTIFICATION INFORMATION |
| 20180801 10:00 | 1000 | ○○○ | 100 | — | 0010 |
| 20180801 10:05 | — | △△△ | 1300 | — | 0010 |
| 20180801 10:30 | 1000 | △△△ | 200 | — | 0010 |
| ... | ... | ... | ... | ... | ... |
| 20180801 11:00 | 1000 | ○○○ | 100 | 100 | 0010 |
| 20180801 11:30 | 1000 | △△△ | 1500 | — | 0011 |
| ... | ... | ... | ... | ... | ... |
| 20180801 12:00 | — | ○○○ | 100 | 100 | 0011 |

INFORMATION MANAGEMENT SYSTEM AND INFORMATION PROCESSING DEVICE

CROSS-REFERENCE TO RELATED APPLICATION

This application claims the benefit of Japanese Pat. App. No. 2018-194781, filed Oct. 16, 2018, which application is incorporated herein by reference in its entirety.

FIELD OF THE INVENTION

The present invention relates generally to an information management system and an information processing device in, for example, a game hall.

BACKGROUND OF THE INVENTION

In a related art, known is a slot machine that displays a plurality of symbols in a stopped state after displaying the plurality of symbols in a scrolled manner, and provides a game value (for example, a coin) based upon a combination of the symbols in the stopped state.

Disclosed is a slot machine capable of allowing a player to feel an attractive payout rate by advancing a game while the player thinks that the game is in an advantageous state (refer to US-A-2012-0115571).

BRIEF SUMMARY OF THE INVENTION

Meanwhile, in the slot machine described above, as a method for paying out a game value to a player according to a result of a game, a method is used in which a payout amount is associated with a member card associated with information on a player registered in advance or a transaction number associated with the payout amount is printed out on a paper ticket by, for example, a bar code, based on which the payout of the game value is performed.

In the method of paying out the game value by using the member card, while it is possible to grasp game behavior of a registered player in a game hall since a game history such as the payout amount, and the like is associated with the member card unique to a member, it is difficult to track and grasp the game behavior of an unregistered player when playing a game because a card unique to the player is not issued.

In the method of performing the payout by printing out the bar code on the paper ticket, the player carries the paper ticket issued as a result of the game to a predetermined cash conversion place and performs cash conversion, and the like. However, since the paper ticket is not associated with information unique to the player and the paper ticket is discarded after the cash conversion such that the paper ticket is not used for a plurality of times of game behavior, it is difficult to track and grasp the game behavior of the player through the paper ticket.

The present invention has been made in consideration of the above-described circumstances and an object thereof is to provide an information management system capable of tracking and grasping the game behavior of a player even when the player is not registered.

An information management system of the present invention includes a gaming machine and an information processing device capable of communicating with the gaming machine, in which the gaming machine includes: an information card processing part that reads identification information that is unique to an information card and is stored in the information card not associated with personal information; a game execution part that executes a game; and a transmission part that transmits, in association with each other, information card identification information of the inserted information card and gaming machine identification information unique to the gaming machine into which the information card is inserted to the information processing device, and the information processing device manages the gaming machine identification information of the gaming machine to which the information card is used as time series information associated with the information card identification information based upon the information card identification information and the gaming machine identification information transmitted from the gaming machine.

According to the above-described configuration, the gaming machine identification information of the gaming machine to which the information card is used is managed as the time series information associated with the information card identification information, thereby making it possible to track and grasp the game behavior with the information card used in the slot machine as a clue even though a player is not a registered player.

According to the above-described configuration, in the information management system of the present invention, the information card processing part writes, to the used information card, a dividend provided to a player as a result of the game executed in the gaming machine.

According to the above-described configuration, when the information card to which the dividend is written is used, the gaming machine identification information associated with the information card identification information of the information card is managed in time series, thereby making it possible to track and grasp the game behavior of the player using the information card.

According to the above-described configuration, the information management system of the present invention includes a unity determination device that determines unity of the player using the information card.

According to the above-described configuration, for example, when the information card is used, a face of the player is captured and associated with the identification information unique to the information card, thereby, when the same player moves to another slot machine and continues to use the information card, making it possible to determine that the game behavior is performed by the same player.

An information processing device of the present invention capable of communicating with a plurality of gaming machines capable of executing a game by using an information card that is not associated with personal information, the device including: a communication interface capable of communicating with the gaming machine; a storage part that stores gaming machine identification information of the gaming machine to which the information card is used as time series information associated with information card identification information based upon the information card identification information unique to the information card and the gaming machine identification information unique to the gaming machine transmitted from the gaming machine; and an output part that outputs the time series information stored in the storage part to outside.

According to the invention, it is possible to cumulatively store information over time on a game played in various gaming machines by using a non-member card instead of a member card associated with the personal information, thereby making it possible to track a game situation of the player using the information card which is not associated with the specific personal information, and the information obtained by the tracking is outputted to a person involved in the casino, or a degree of freedom in design such as outputting alert information, and the like can be given by making a determination based upon the alert information using the information obtained by the tracking.

The present invention provides an information management system capable of tracking and grasping the game behavior of a player even when the player is not registered.

BRIEF DESCRIPTION OF THE DRAWINGS

FIGS. 8A and 8B are diagrams illustrating history information stored in the slot machine according to the embodiment of the present invention;

FIG. 9 is a diagram illustrating history information stored in a database of an information processing device according to an embodiment of the present invention;

DETAILED DESCRIPTION OF THE PREFERRED EMBODIMENT

[Overall Configuration of Information Management System]

Figure 1A:
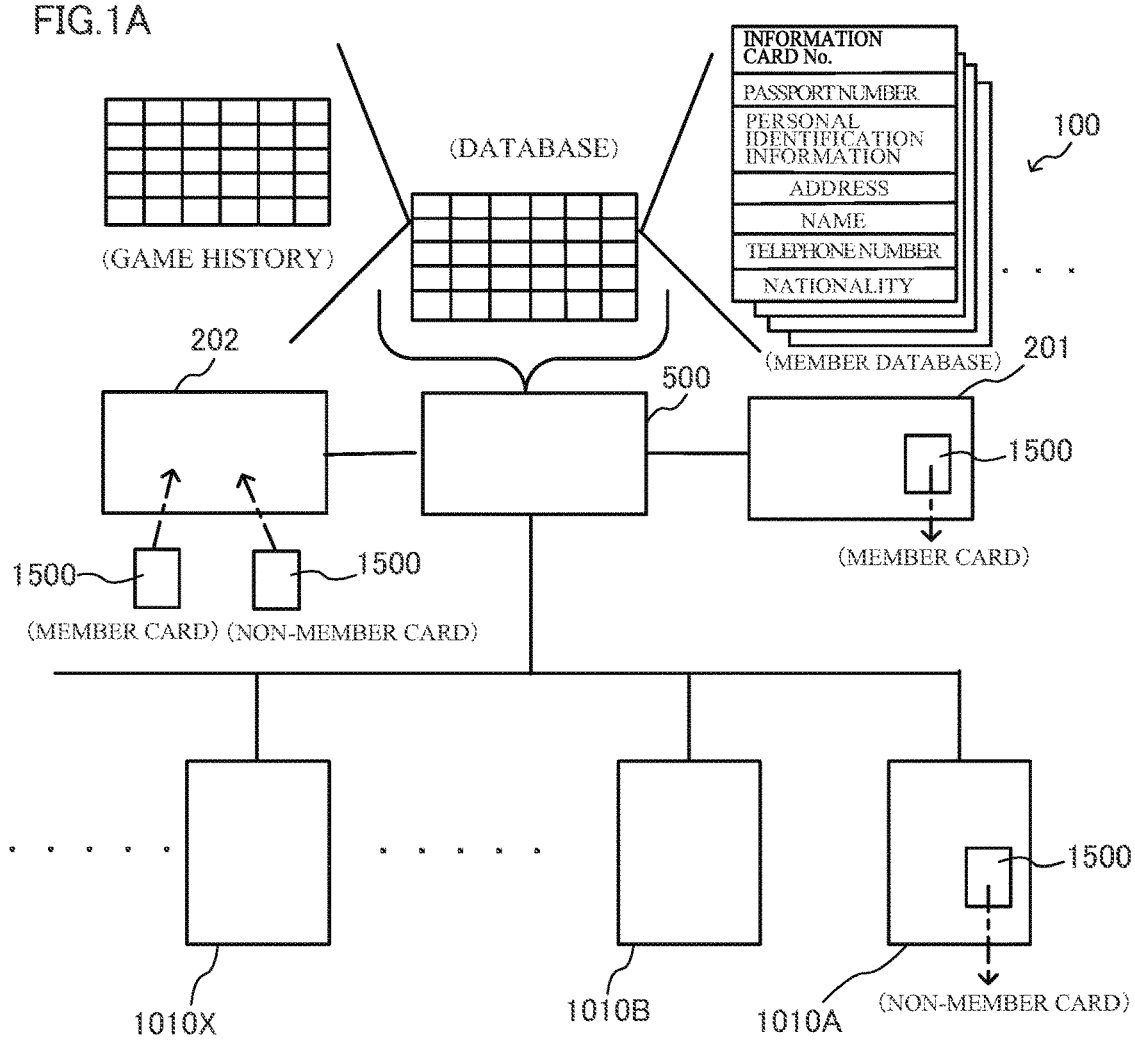
FIGS. 1A and 1B are diagrams illustrating an overall configuration of an information management system and a configuration of an information processing device according to an embodiment of the present invention.
Figure 1B:
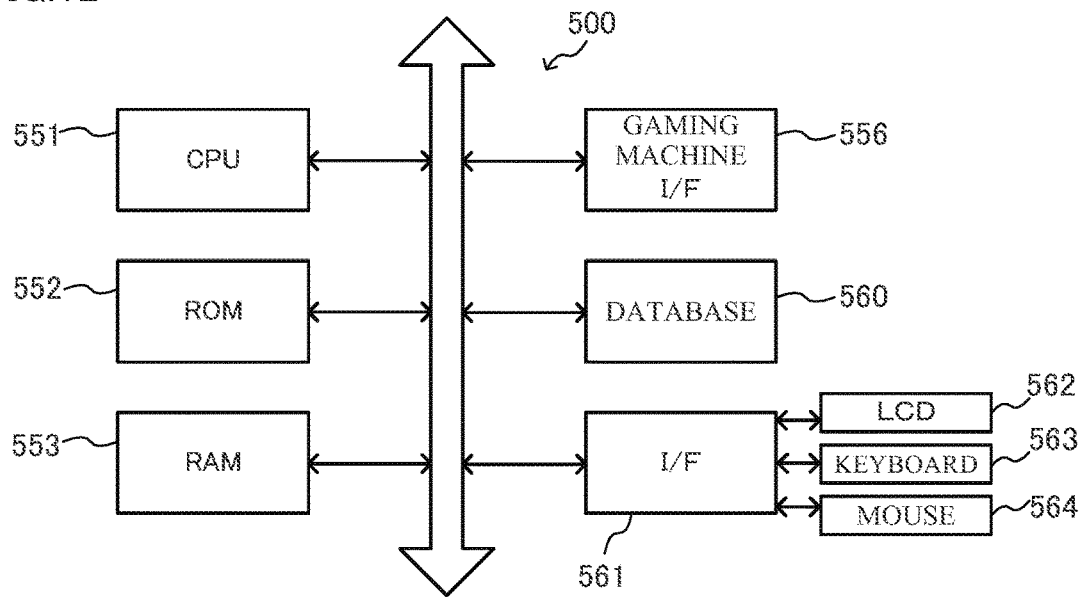

FIG. 1A is a block diagram illustrating an information management system 100 according to an embodiment of the present invention. As illustrated in FIGS. 1A and 1B, the information management system 100 is formed of a plurality of gaming machines (for example, slot machines 1010A, 1010B, and the like) installed in a game hall such as, for example, a casino, and the like and an information processing device 500 communicably connected thereto in a bidirectional manner.

A member information card issuing device 201 is connected to the information processing device 500, and an IC card 1500 is configured to be issued as a member information card in the member information card issuing device 201. In the member information card, unique information card identification information (information card number (No)) for specifying the IC card 1500 is stored, and in the information processing device 500, member information is stored in a member database in association with each information card number. A player who becomes a member registers personal information (for example, name, address, telephone number, nationality, passport number, personal identification information for identifying an individual issued by a government, and the like) in the member database as the member information. In the member database, the personal information is registered in association with the information card identification information (information card number) for specifying the information card.

The information card to which the information card number is imparted is issued from the member information card issuing device 201, and the issued information card is used when a player registered as a member plays a game in the slot machines 1010A, 1010B, and the like.

A cashier 202 for performing cash conversion based upon the IC card 1500 (member information card or non-member information card) is connected to the information processing device 500. After the game, a player playing a game by using the IC card 1500 as the member information card or the non-member information card (described later) inserts the IC card 1500 paid out from the slot machines 1010A, 1010B, and the like into a card reader of the cashier 202, such that a currency corresponding to the balance owned by the player associated with the information card identification information (information card number) of the IC card 1500 is paid out to the player. In the embodiment, information on the balance associated with the information card is written directly to the IC card 1500, but the present invention is not limited thereto. For example, the information processing device 500 may store the balance information in association with the information card number. Here, the balance information stored in the memory of the information processing device 500 may be read out corresponding to the card number of the IC card 1500 read by the card reader of the cashier 202, after which the currency may be paid back based upon the read balance information.

In the non-member information card (IC card 1500), a player who is not registered as a member first inserts a currency into any one of the slot machines 1010A, 1010B, and the like and plays a game, after which a dividend provided to the player as a result of the game and an amount corresponding to the number of credits remaining after making a BET with respect to an inserted amount are written to the non-member information card (IC card 1500), and the non-member information card is newly paid out from any one of the slot machines 1010A, 1010B, and the like in which the play is performed. The player inserts the newly paid-out non-member information card (IC card 1500) into other slot machines 1010A, 1010B, and the like, whereby a new game can be played by using the number of credits corresponding to the balance information written to the non-member information card. When the non-member information card (IC card 1500) is inserted into the slot machines 1010A, 1010B, and the like and thus a game is played, a game value (corresponding to a currency amount, credit number, and the like) based upon the number of credits such as a dividend given as a result of the game play is written to the non-member information card (IC card 1500) inserted into the slot machines 1010A, 1010B, and the like when the game is played. That is, the balance information of the non-member information card is updated and the non-member information card is paid out. Accordingly, a player who is not registered as a member can play a game in the plurality of slot machines 1010A, 1010B, and the like while using one non-member information card.

Even when the inserted IC card 1500 is the member information card issued to the player registered as the member, the balance information is updated and paid out with respect to the inserted member information card in the same manner as that of the non-member information card.

FIG. 1B is a block diagram illustrating a configuration of the information processing device 500. As illustrated in FIG. 1B, the information processing device 500 includes a configuration in which a central processing unit (CPU) 551, a read only memory (ROM) 552, a random access memory (RAM) 553, a gaming machine I/F 556, a database 560, an I/F 561, a liquid crystal display (LCD) 562, a keyboard 563, and a mouse 564, and the like are connected to a bus. In the database 560, the member information associated with the information card number, the balance information and the game history information associated with the IC card 1500 issued to the member, and the balance information and the game history information associated with the IC card 1500 issued to the non-member, and the like are stored.

[Overall Configuration of Slot Machine]

Figure 2:
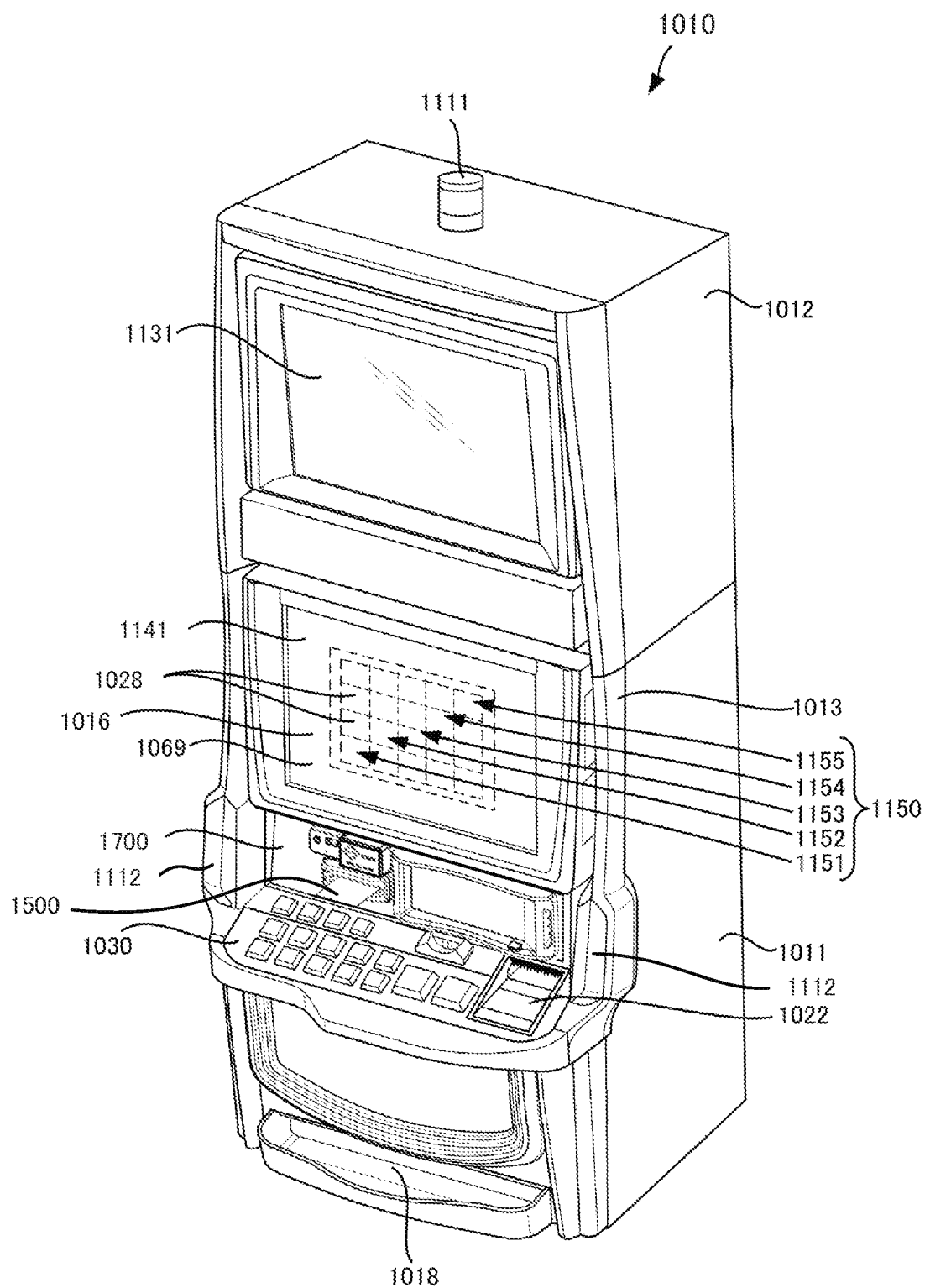
FIG. 2 is a perspective view illustrating a configuration of a slot machine according to an embodiment of the present invention.

Next, an overall configuration of the slot machine 1010 will be described with reference to FIG. 2.

In the slot machine 1010, as a game medium, the member information card (IC card 1500), the non-member information card (IC card 1500), and a bill or electronic valuable information corresponding to the game values thereof are used. Particularly, in the embodiment, credit related data such as cash data stored in the member information card or the non-member information card (hereinafter referred to as IC card 1500) is used.

The slot machine 1010 includes a cabinet 1011, a top box 1012 installed on the upper side of the cabinet 1011, and a main door 1013 provided on the front surface of the cabinet 1011.

The main door 1013 incudes a symbol display device 1016 referred to as a lower image display panel 1141. The symbol display device 1016 is formed of a transparent liquid crystal panel. In the screen on which the symbol display device 1016 is displayed, a display window 1150 is provided in a central part thereof. The display window 1150 is formed of 20 pieces of display blocks 1028 in five columns and four rows. The four pieces of display blocks 1028 in each column form pseudo reels 1151 to 1155 and are rotated according to an operation of a player. Each of the pseudo reels 1151 to 1155 can be rearranged in such a manner that the four pieces of display blocks 1028 are moved and displayed in a downward direction while changing the speed as a whole such that a symbol 1501 displayed on each of the display blocks 1028 is rotated in a vertical direction and then is stopped.

Here, the "rearranged" indicates a state in which the symbol 1501 is arranged again after the arrangement of the symbol 1501 is released. The "arrangement" indicates that the symbol 1501 is in a state of being visually confirmable by a player. The slot machine 1010 executes a so-called slot game in which a dividend corresponding to a winning combination is provided depending on the arrangement state of the symbol 1501 based upon the stop state of the rotating pseudo reels 1151 to 1155.

In the embodiment, it is described that the slot machine 1010 is a so-called video slot machine, but the slot machine 1010 of the present invention may adopt a so-called mechanical reel or may be substituted for some of the pseudo reels 1151 to 1155.

A touch panel 1069 is provided on the front surface of the symbol display device 1016, and a player can input various instructions by operating the touch panel 1069. An input signal is transmitted from the touch panel 1069 to a main CPU 1071.

An upper image display panel 1131 is provided on the front surface of the top box 1012. The upper image display panel 1131 is formed of a liquid crystal panel and forms a display. The upper image display panel 1131 displays an image relating to a performance, an image showing an introduction of the contents of the game and the description of a rule. The top box 1012 is provided with a lamp 1111.

A number-of-credits display part (not illustrated) is displayed at the upper part of the display window 1150, and the current number of credits is displayed thereon. Here, the "credit" is a virtual game medium on a game used when a player makes a BET. The total number of credits currently owned by the player is displayed on the number-of-credits display part.

A fractional cash display part (not illustrated) is displayed at the lower part of the number-of-credits display part. The fractional cash display part displays fractional cash. The "fractional cash" indicates cash that is not converted into the credit because the inserted amount is not sufficient.

The IC card 1500 is inserted into a PTS terminal 1700 which will be described later; the number of credits stored in the IC card is displayed on the number-of-credits display part; and the fractional cash stored in the IC card is displayed on the fractional cash display part. These numerical values are stored in a member management server in association with an identification code of the member card.

Here, the IC card is a non-contact IC card and incorporates an integrated circuit (IC) for recording and computing various data such as a credit, and the like, and is capable of performing, for example, short-range radio communication using a radio frequency identification (RFID) technology such as near field communication (NFC). The player can own the credit related data by using the IC card 1500 and can freely carry the IC card 1500 between different slot machines. Then, the IC card 1500 is inserted into the PTS terminal 1700 of the slot machine 1010, whereby the player can play a game such as a unit game, and the like in the slot machine 1010 by using the credit related data (amount data) stored in the IC card 1500.

The player can store cash such as a coin and a bill in the IC card 1500 as cash data from a machine installed in the game hall.

At the lower part of the lower image display panel 1141, the PTS terminal 1700 is incorporated in the cabinet 1011. Speakers 1112 are respectively provided on the left and right sides of the PTS terminal 1700 and the lamp 1111 is provided at the upper part of the top box 1012. In the slot machine 1010, the performance of the unit game is executed by the display of an image by the upper image display panel 1131, the output of sound by the speaker 1112, and the output of light by the lamp 1111. The PTS terminal 1700 is provided in the slot machine 1010 as accessory or internally.

[Configuration of PTS Terminal]

Figure 3:
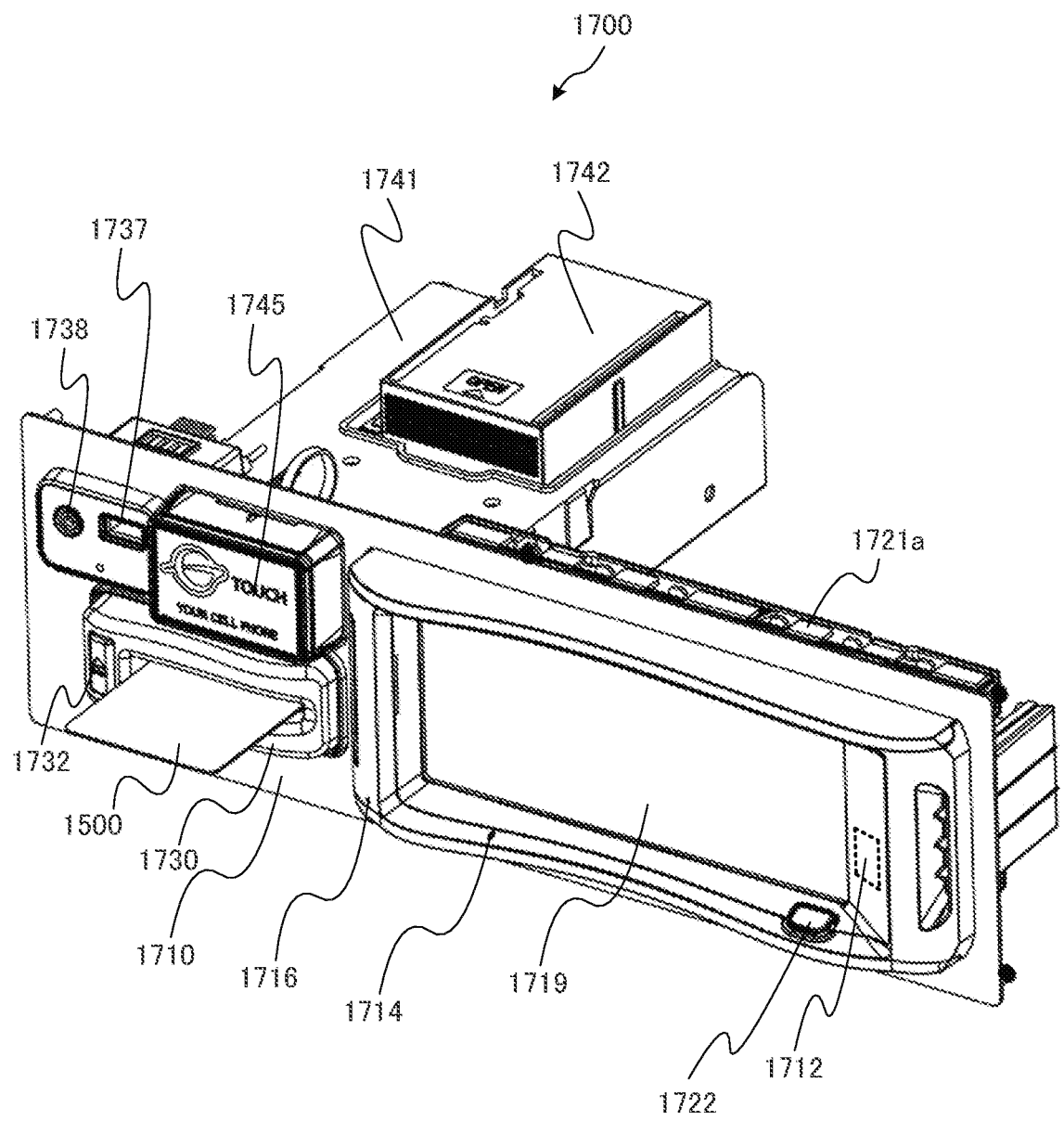
FIG. 3 is a perspective view illustrating a PTS terminal incorporated in the slot machine according to the embodiment of the present invention.

FIG. 3 is a diagram illustrating the PTS terminal 1700 incorporated in the slot machine 1010. The PTS terminal 1700 can be incorporated into various types of gaming machines of various manufacturers by performing data exchange by using a data interface common between the gaming machines.

The PTS terminal 1700 includes a panel 1710; each part disposed on the front surface of the panel 1710 is visually recognized by the player; and a member disposed on the rear surface of the panel 1710 is stored inside the slot machine 1010 such that the member cannot be seen by the player.

An LCD 1719 including a touch panel function is provided on the right side of the front surface of the panel 1710. The LCD 1719 displays, for example, information on the member and information for the member, and a screen size is 6.2 inches (about 15.7 cm). An LCD cover is provided around the LCD 1719. In the embodiment, the LCD 1719 is configured to include the touch panel function, but the instruction of the player may be inputted by another input device such as a keyboard and a mouse.

A full color LED 1721*a* (light emitting plate 1720*a*) and a full color LED 1721*b* (light emitting plate 1720*b*) are configured to be capable of performing light emission contributing to a warning of a fraudulent act.

An imaging window 1712 is provided on the right side of the LCD 1719. A human body detection camera 1713 disposed inside the LCD cover or on the back side of the panel 1710 captures an image of a player, and the like through the imaging window 1712. The imaging window 1712 may be, for example, a half mirror material to which shield processing such as smoke, and the like is applied.

A card insertion slot 1730 into and from which the IC card 1500 can be inserted and removed is provided at the lower left and front surface of the panel 1710. A card insertion part of the card insertion slot 1730 is provided with a full color LED 1731 (refer to FIG. 5), and it is possible to notify the remaining number of IC cards 1500 accumulated in a card stacker 1742 which will be described later by lighting in a plurality of colors. The card insertion slot 1730 is provided with an eject button 1732, and a red LED 1733 (refer to FIG. 5) provided near the eject button 1732 is turned on so that a position of the eject button 1732 and processing of an eject operation can be understood.

A card unit 1741 and a card stacker 1742 are provided at a position on the back side of the panel 1710 corresponding to the card insertion slot 1730, and the card insertion slot 1730 is configured as a part of the card unit 1741. About 30 pieces of IC cards 1500 can be stored in the card stacker 1742, and when a non-member player who newly plays a unit game settles a credit, the IC card 1500 stored in the card stacker 1742 is taken out and discharged to the card insertion slot 1730 as the non-member information card. That is, when the game is played with a currency inserted into a bill validator 1022 without inserting the IC card 1500 from the card insertion slot 1730, the IC card 1500 is discharged from the card insertion slot 1730 as the non-member information card in a state of being not associated with the personal information of the member database.

On the other hand, when the member information card (IC card 1500) associated with the personal information of the player in advance is inserted from the card insertion slot 1730, or when the non-member information card (IC card 1500) which is not associated with the personal information is inserted from the card insertion slot 1730, the inserted IC card 1500 is held in the card unit 1741, and information such as the balance information which is a result of the game in the slot machine 1010 is written to the held IC card 1500 when the card is discharged.

The member information card or the non-member information card (IC card 1500) held in the card unit 1741 updates credit information by NFC, and the like at the time of settlement of the credit, after which the IC card 1500 is discharged from the card insertion slot 1730. The IC card 1500 is completely stored inside the card unit 1741 while the player plays the unit game.

When the absence of the player is detected by a human body detection camera, and the like even though the IC card 1500 remains at the time of the settlement of the credit, the IC card 1500 can be configured to be stored in the card stacker 1742. Accordingly, for example, when the player leaves the IC card 1500 and leaves his or her seat after knowing that the remaining credit is low, or even when the player simply forgets to take the IC card 1500 and leaves the seat, the IC card 1500 does not remain held in the card unit 1741 for a long time.

A USB terminal 1737 and an audio terminal 1738 are provided on the front upper left side of the panel 1710. The USB terminal 1737 is configured to perform charging, and the like by connecting a USB device to the USB terminal 1737. The audio terminal 1738 is, for example, a four-pole terminal, and a headset is inserted thereinto, such that the user can talk to the other party with a headphone and a microphone. The audio terminal 1738 is configured as a two-pole or a three-pole terminal such that the user also can listen to the sound with the headphone.

A touch unit 1745 is provided on the front surface of the panel 1710 and on the left side of the LCD 1719. The touch unit 1745 includes: a writer that writes data by data communication to an IC device including an IC chip (for example, a non-contact IC card and a mobile phone and a smart phone provided with a communication function by NFC); and an RFID module that can function as a reader that reads the data from the IC device by the data communication. LEDs 1746 (not illustrated) are respectively disposed at four corners of the front surface of the touch unit 1745. In addition to the touch unit 1745, or in place of the touch unit 1745, an information recording medium reader for reading information stored in an information recording medium such as a magnetic card may be provided. Here, the magnetic card can be used as a member card instead of the IC card 1500.

As described above, in the PTS terminal 1700 according to the embodiment of the present invention, various devices including a microphone function, a camera function, a speaker function, a display function, and the like are integrated to form one unit, thereby achieving space saving. Accordingly, for example, when the LCD is directed toward the player in a state where each of the functions is installed as a single part, there is no inconvenience that the speaker cannot be installed toward the player.

In the PTS terminal 1700 according to the embodiment of the present invention, when the IC card 1500 is inserted into the card insertion slot 1730, the content of the IC card 1500 is configured to be read by the card unit 1741 and the entire IC card 1500 is configured to be taken in and held (inside the PTS terminal 1700), however, in addition thereto, the touch unit 1745 is provided, thereby making it possible to further perform the data communication with another IC card, a mobile phone, and a smart phone.

[Circuit Configuration of Slot Machine]

Figure 4:
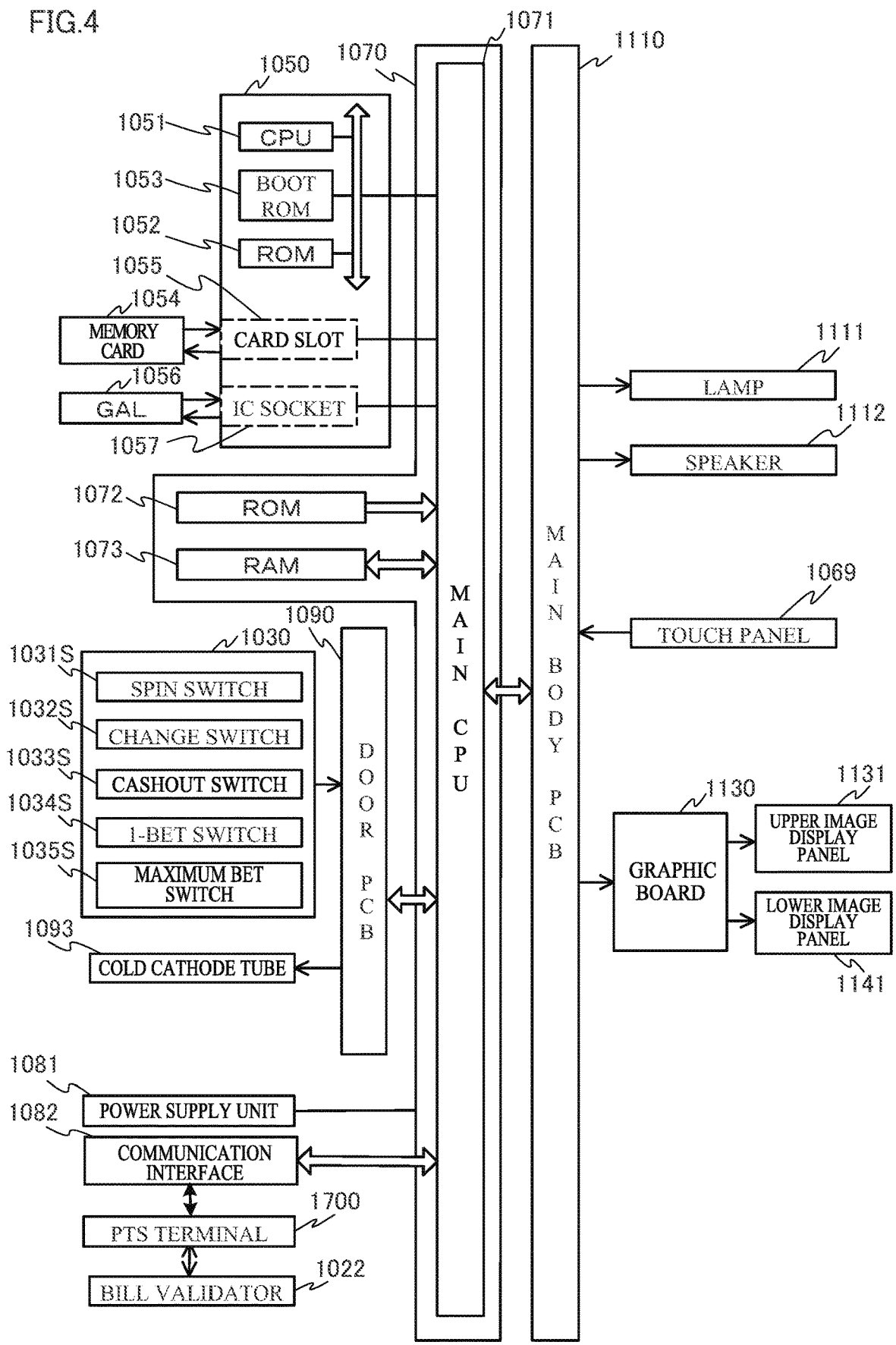
FIG. 4 is a block diagram illustrating a configuration of the slot machine according to the embodiment of the present invention.

Next, a configuration of a circuit provided in the slot machine 1010 will be described with reference to FIG. 4.

A gaming board 1050 includes a CPU 1051, a ROM 1052, and a boot ROM 1053 which are connected to each other by an internal bus, a card slot 1055 corresponding to a memory card 1054, and an IC socket 1057 corresponding to a generic array logic (GAL) 1056.

The memory card 1054 is formed of a non-volatile memory and stores a game program and a game system program. The game program includes a program related to the progress of the game and a program for executing a performance (notification) by an image or a sound. The game program includes a symbol determination program. The symbol determination program is a program for determining a symbol to be rearranged in the display block 1028.

The card slot 1055 is configured so that the memory card 1054 can be inserted and removed, and is connected to a mother board 1070 by an IDE bus. Therefore, the memory card 1054 is removed from the card slot 1055; another game program is written to the memory card 1054; and the memory card 1054 is inserted into the card slot 1055, whereby the type and content of the game performed by the slot machine 1010 can be changed.

The GAL 1056 is a type of a programmable logic device (PLD) including an OR fixed-type array structure. The GAL 1056 includes a plurality of input ports and output ports, and outputs corresponding data from the output port when the input port receives a predetermined input.

The IC socket 1057 is configured so that the GAL 1056 can be attached and detached, and is connected to the mother board 1070 by a PCI bus. The content of the game performed by the slot machine 1010 can be changed by replacing the memory card 1054 with one into which another program is written, or by rewriting the program written to the memory card 1054 into another program.

The CPU 1051, the ROM 1052, and the boot ROM 1053 connected to each other by the internal bus are connected to the mother board 1070 by the PCI bus. The PCI bus transmits a signal between the mother board 1070 and the gaming board 1050, and supplies power from the mother board 1070 to the gaming board 1050.

An authentication program is stored in the ROM 1052. The boot ROM 1053 stores a preliminary authentication program and a program (boot code) for activating the preliminary authentication program by the CPU 1051.

The authentication program is a program (falsification check program) for authenticating the game program and the game system program.

The mother board 1070 is configured by using a general-purpose mother board available on the market (a printed wiring board on which a basic component of a personal computer is mounted), and includes a main CPU 1071, a ROM 1072, a RAM 1073, and a communication interface 1082. The motherboard 1070 corresponds to a controller 1100 in the embodiment.

The ROM 1072 is formed of a memory device such as a flash memory, and the like, and stores a program such as a basic input/output system (BIOS) executed by the main CPU 1071 and permanent data. When the BIOS is executed by the main CPU 1071, predetermined initialization processing of a peripheral device is performed. Fetching processing of the game program and the game system program stored in the memory card 1054 is started via the gaming board 1050. In the present invention, the ROM 1072 may be one whose content can be rewritten or cannot be rewritten.

The RAM 1073 stores data used when the main CPU 1071 operates and a program such as the symbol determination program, and the like. For example, when the fetching processing of the game program, the game system program, and the authentication program is performed, these can be stored. The RAM 1073 is provided with a work area when the program is executed. For example, an area for storing a counter that manages the number of games, the number of BETs, the number of payouts, the number of credits, and the like, and an area for storing a symbol (code number) determined by lottery are provided therein.

The communication interface 1082 is configured to control transmission and reception of data with the PTS terminal 1700. A door printed circuit board (PCB) 1090 and a main body PCB 1110 which will be described later are respectively connected to the mother board 1070 by a USB. A power supply unit 1081 is connected to the mother board 1070.

When power is supplied form the power supply unit 1081 to the mother board 1070, the main CPU 1071 of the mother board 1070 is activated, and the power is supplied to the gaming board 1050 via the PCI bus, thereby activating the CPU 1051.

An input device such as a switch and a sensor and a peripheral device whose operation is controlled by the main CPU 1071 are connected to the door PCB 1090 and the main body PCB 1110.

A control panel 1030 and a cold cathode tube 1093 are connected to the door PCB 1090.

The control panel 1030 is provided with a spin switch 1031S, a change switch 1032S, a CASHOUT switch 1033S, a 1-BET switch 1034S, and a maximum BET switch 1035S corresponding to the above-described respective buttons. Each switch detects that a corresponding button is pressed by a player, and outputs a signal to the main CPU 1071.

The lamp 1111, the speaker 1112, the touch panel 1069, and a graphic board 1130 are connected to the main body PCB 1110. The bill validator 1022 is connected to the PTS terminal 1700 in the present example, but may be configured to be connected to the slot machine 1010.

The lamp 1111 is turned on based upon a control signal outputted from the main CPU 1071. The speaker 1112 outputs a sound such as BGM, and the like based upon the control signal outputted from the main CPU 1071.

The touch panel 1069 detects a position where a finger of a player touches on the lower image display panel 1141, and outputs a signal corresponding to the detected position to the main CPU 1071.

The bill validator 1022 is a device for validating the propriety of a bill and for receiving and inputting a legitimate bill into the cabinet 1011. Then, the bill inputted into the cabinet 1011 is converted into a credit, and the converted credit is added as a credit owned by a player.

The graphic board 1130 controls the display of the images respectively performed by the upper image display panel 1131 and the lower image display panel 1141 based upon the control signal outputted from the main CPU 1071. The graphic board 1130 includes a video display processor (VDP) for generating image data and a video RAM for storing the image data generated by the VDP. The image data used when generating the image data by the VDP are read from the memory card 1054 and included in the game program stored in the RAM 1073.

The graphic board 1130 includes the VDP for generating the image data based upon the control signal outputted from the main CPU 1071 and the video RAM for temporarily storing the image data generated by the VDP. The image data used when generating the image data by the VDP are read from the memory card 1054 and included in the game program stored in the RAM 1073.

[Circuit Configuration of PTS Terminal]

Figure 5:
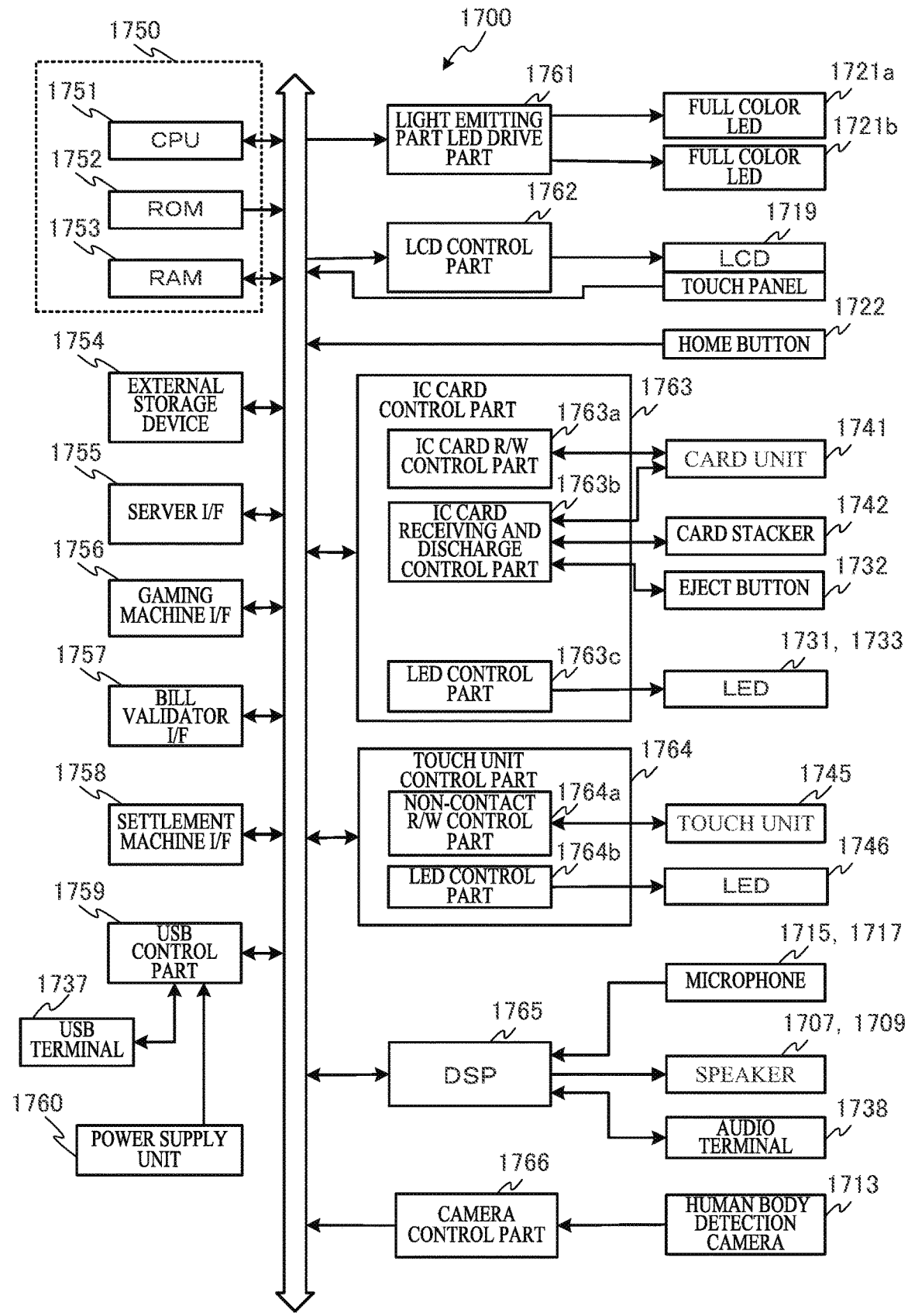
FIG. 5 is a block diagram illustrating a configuration of the PTS terminal according to the embodiment of the present invention.

Next, a configuration of a circuit provided in the PTS terminal 1700 will be described with reference to FIG. 5.

A PTS controller 1750 that controls the PTS terminal 1700 includes a CPU 1751, a ROM 1752, and a RAM 1753.

The CPU 1751 performs the execution control of each component of the PTS terminal 1700, and executes or computes various programs stored in the ROM 1752. For example, the CPU 1751 executes a credit update program to update the credit related data stored in the IC card 1500.

The ROM 1752 is formed of a memory device such as a flash memory, and the like, and stores permanent data to be executed by the CPU 1751. For example, the ROM 1752 stores the credit update program that rewrites the credit related data stored in the IC card 1500, an interlocking performance control program to be executed in response to a request from a bonus server, and a notification program to be executed in response to a request (notification information, and the like) from a hole management server.

The RAM 1753 temporarily stores data necessary when various programs stored in the ROM 1752 are executed.

An external storage device 1754 is, for example, a storage device such as a hard disk device, and stores a program to be executed by the CPU 1751 and data used by the program to be executed by the CPU 1751.

A server interface (I/F) 1755 implements data communication between a server such as a hall management server, a bonus server, and the like and the PTS terminal 1700. A gaming machine I/F 1756 implements data communication between the controller 1100 of the slot machine 1010 and the PTS terminal 1700, and a predetermined protocol may be used for the data communication.

The PTS terminal 1700 is connected to the bill validator 1022 via a bill validator I/F 1757 and to a settlement machine 1868 via a settlement machine I/F 1758, and can transmit and receive data as necessary.

A USB control part 1759 determines whether to supply power from a power supply unit 1760 to the USB terminal 1737 and can charge the USB terminal 1737 when a predetermined condition is satisfied. The player can charge an electronic device by connecting the electronic device to the USB terminal 1737 when the predetermined condition is satisfied.

In order to cause the light emitting plate 1720*a* on the upper side of the LCD 1719 to emit light in response to a notification request from the hall management server, an interlocking performance start request from the bonus server, and the like, a light emitting part LED drive part 1761 controls the full color LED 1721*a* to be turned on at a predetermined timing, and in order to cause the light emitting plate 1720*b* on the lower side of the LCD 1719 to emit light, the light emitting part LED drive part 1761 controls the full color LED 1721*b* to be turned on at a predetermined timing.

An LCD control part 1762 is controlled so that information contributing to a fraudulent act such as money laundering, member information, information for the member, and the like are displayed on the LCD 1719, and data read from the IC card 1500 and data inputted by the player are displayed. The LCD 1719 includes a touch panel function, and when the touch panel is operated by the player, a predetermined signal is transmitted to the CPU 1751.

A home button 1722 is provided near the LCD 1719 and is a button for shifting a screen displayed on the LCD 1719 to a predetermined upper screen. When the home button 1722 is pressed by the player, an operation of the player is transmitted to the CPU 1751, after which the CPU 1751 transmits a command to the LCD control part 1762 so as to update the display of the LCD 1719 according to the operation.

An IC card control part 1763 controls insertion and discharge of the IC card 1500, and writing of the credit data. The IC card control part 1763 includes an IC card reader and writer (R/W) control part 1763*a*, an IC card receiving and discharge control part 1763*b*, and an LED control part 1763*c*.

The IC card R/W control part 1763*a* controls the card unit 1741, thereby updating the credit related data stored in the IC card 1500. When the IC card 1500 is newly issued, the credit related data corresponding to the settled amount are stored. The card unit 1741 includes an antenna part for reading or writing data from or to the IC card 1500 by NFC, and the like.

The card unit 1741 includes functions of an IC card reader for reading the information stored in the IC card 1500 and of an IC card writer for writing the information to the IC card 1500, but may include either one of the above-described functions as necessary.

The IC card receiving and discharge control part 1763*b* controls receiving and discharge of the IC card 1500. When the IC card 1500 is inserted into the card insertion slot 1730 by a player, the IC card is controlled to be held in the card unit 1741 while the player executes a game. After the credit related data are written to the IC card 1500 at the time of settlement, the IC card 1500 is controlled to be discharged therefrom. When the eject button 1732 is pressed, the IC card 1500 is discharged.

When the IC card 1500 is newly issued, the IC card 1500 is newly taken out of the card stacker 1742, and then the IC card 1500 is supplied to the card unit 1741 in order to store the credit related data.

The LED control part 1763*c* is controlled so that the LED (full color LED 1731) provided near the card insertion slot 1730 of the card unit 1741 is turned on and the LED (red LED 1733) provided near the eject button 1732 is turned on.

A touch unit control part 1764 controls data transmission and reception according to a touch operation of the IC card 1500, a mobile phone, a smart phone, and the like. The touch unit control part 1764 includes a non-contact R/W control part 1764*a* and an LED control part 1764*b*.

The non-contact R/W control part 1764*a* determines whether the IC card 1500 or the mobile phone approaches a predetermined distance (for example, a touch operation is performed) in the touch unit 1745, and when the IC card 1500 or the mobile phone approaches the predetermined distance, the non-contact R/W control part 1764*a* acquires a reading result, and the like from the touch unit 1745. The touch unit 1745 includes an antenna part for transmitting and receiving data to and from the IC card 1500 and the mobile phone by NFC, and the like.

The touch unit 1745 includes functions of an IC card reader for reading information stored in the IC card 1500 and the mobile phone, and an IC card writer for writing information to the IC card 1500 and the mobile phone, but may include either one of the above-described functions as necessary.

The LED control part 1764*b* controls the LEDs 1746 disposed at four corners of the front surface of the touch unit 1745 and lights the LEDs 1746 at a predetermined timing.

A DSP 1765 receives voice data acquired from microphones 1715 and 1717, performs predetermined voice processing, and transmits the voice data to the CPU 1751. The DSP 1765 transmits the received voice data to speakers 1707 and 1709. The DSP 1765 outputs the received voice to the headphone with respect to the audio terminal connected to the headset, processes the voice received from the microphone, and transmits the processed voice to the CPU 1751. Here, a schematic configuration is illustrated and an A/D converter, a D/A converter, an amplifier, and the like are omitted.

A camera control part 1766 acquires an image of a player, and the like captured by the human body detection camera 1713, performs predetermined image processing as necessary, and transmits the processed data to the CPU 1751. The data are transmitted to, for example, the hall management server, the member management server, and the like via the server I/F 1755.

The camera control part 1766 transmits imaging information captured by the human body detection camera 1713 to the hall management server, and the like in response to an instruction from the hall management server.

[Content of Program Executed in Slot Machine]

Figure 6:
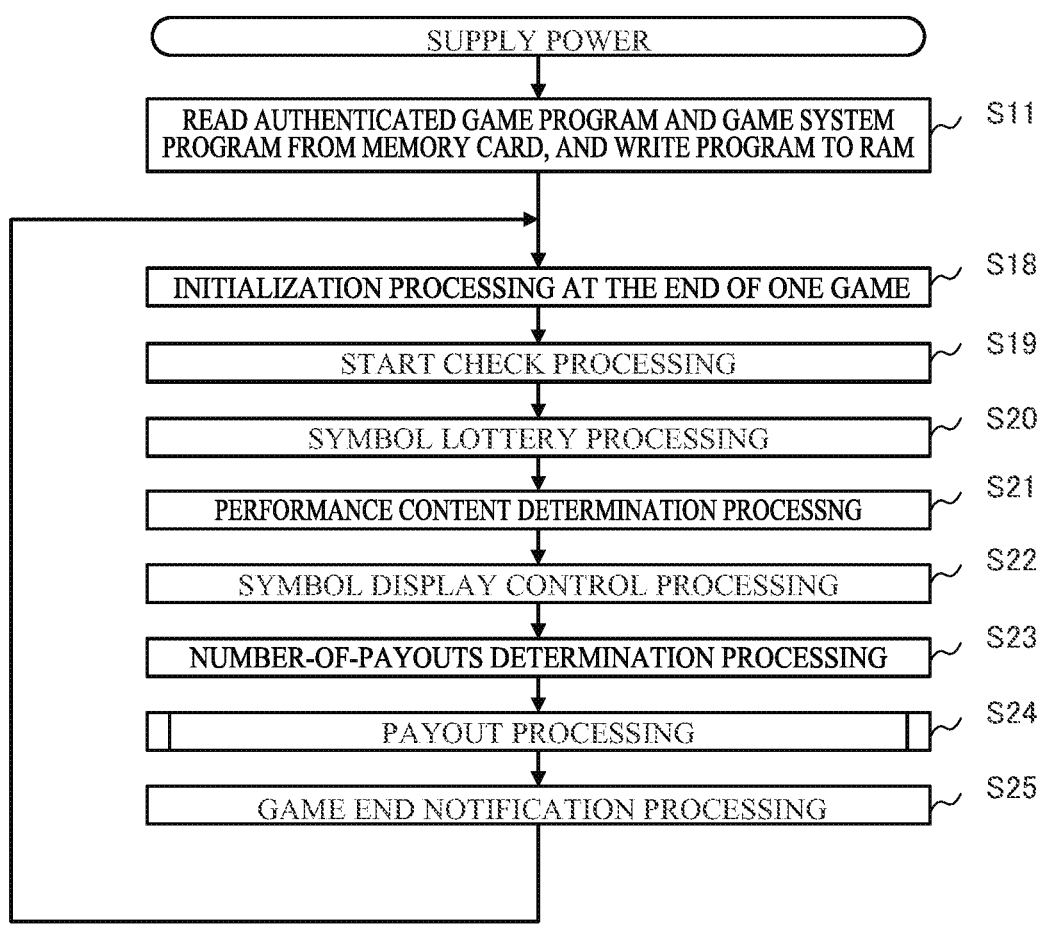
FIG. 6 is a flowchart illustrating a procedure of main control processing of the slot machine according to the embodiment of the present invention.

Next, a program to be executed by the slot machine 1010 will be described with reference to FIG. 6. The slot machine 1010 transmits various kinds of game information to the hall management server at an appropriate timing.

[Main Control Processing]

First, main control processing will be described with reference to FIG. 6. First, when power is supplied to the slot machine 1010, the main CPU 1071 reads the game program and game system program authenticated from the memory card 1054 via the gaming board 1050, and writes the read game program and game system program to the RAM 1073 (step (hereinafter abbreviated as S) 11).

Next, the main CPU 1071 performs initialization processing at the end of one game (S18). For example, data that become unnecessary for each game in the work area of the RAM 1073 such as the number of BETs and symbols determined by lottery are cleared.

Next, the main CPU 1071 performs start check processing which will be described later (S19). In S19, the input check of a BET switch and a spin switch is performed. In the embodiment, when the IC card 1500 (member information card or non-member information card) is inserted into the card insertion slot 1730, the game value is read from the inserted IC card 1500 and is set to a number-of-credits counter, whereby it is possible to play the game within a range of the set number of credits. When the IC card 1500 is not inserted thereinto, the number-of-credits counter is set in accordance with an amount of a currency inserted into the bill validator 1022, whereby the game can be played.

Next, the main CPU 1071 performs symbol lottery processing which will be described later (S20). In S20, a stop-scheduled symbol is determined based upon a random numerical value for symbol determination.

Next, the main CPU 1071 performs performance content determination processing (S21). The main CPU 1071 extracts a random numerical value for the performance, and determines one of a plurality of predetermined performance contents by lottery. The contents of the performance can be determined according to a winning combination and a situation of the game in the slot machine 1010. For example, it can be configured to vary the lottery probability with respect to each performance according to the winning combination and the situation of the game in the slot machine 1010.

Next, the main CPU 1071 performs symbol display control processing which will be described later (S22). In S22, scrolling of the five columns of pseudo reels 1151 to 1155 (first to fifth video reels) is started, and then the stop-scheduled symbol determined in the symbol lottery processing of S20 is stopped at a predetermined position (for example, the display window 1150 of the lower image display panel 1141). That is, for each reel, four symbols including the stop-scheduled symbol are displayed in the display window 1150. For example, when the stop-scheduled symbol is a symbol of a code number "10" and the symbol of code number "10" is displayed in the upper stage area, the respective symbols of code numbers "11", "12" and "13" are respectively displayed in the upper middle stage, lower middle stage, and lower stage in the display window 1150.

Next, the main CPU 1071 performs number-of-payouts determination processing which will be described later (S23). In S23, the number of payouts is determined based upon the combination of symbols displayed on a winning line, and is stored in a number-of-payouts counter provided in the RAM 1073.

Next, the main CPU 1071 performs payout processing (S24). The main CPU 1071 adds a value stored in the number-of-payouts counter to the number-of-credits counter provided in the RAM 1073. Here, for example, when a player presses a CASHOUT button, the CASHOUT switch 1033S which detects a fact that the CASHOUT button is pressed outputs a signal to the main CPU 1071, and the number of credits stored in the IC card 1500 held in the card unit 1741 is updated to the value of the number-of-credits counter. That is, when the information card (member information card or non-member information card) is inserted into the card unit 1741, the number of credits (game value) read from the inserted information card (IC card 1500) is written to the number-of-credits counter; the game (BET) is played according to the written number of credits; and the result in which the dividend is added according to the result of the game and the value of the number-of-credits counter which is formed of the number of credits as a result of subtracting the number of credits for the number of BETs are written as the balance information of the game value to the IC card 1500 to be finally paid out, whereby the balance information of the IC card 1500 is updated and the IC card 1500 is discharged from the card insertion slot 1730. When the game is played by a currency inserted into the bill validator 1022 in a state where the IC card 1500 is not inserted into the card unit 1741, a dividend given to the player as a result of the game and a balance of the inserted currency are stored in the number-of-credits counter, after which the dividend and the balance are written as the balance information to the unused IC card 1500 prepared in the card stacker 1742 according to the operation of the CASHOUT button. Next, the IC card 1500 is discharged from the card insertion slot 1730 as the non-member information card.

Next, the main CPU 1071 performs game end notification processing (S25). In S25, the main CPU 1071 transmits data indicating that one game ends (data including game end date data capable of specifying the game end date and time) to the PTS terminal 1700 (together with the identification code, and the like of the IC card 1500 when the IC card 1500 and the like are inserted thereinto and thus the player can be identified). The PTS terminal 1700 transmits the aforementioned data to the hall management server, and the hall management server stores the data. In response thereto, the bonus server performs the lottery of the bonus game. When the processing of S25 is completed, the processing is returned to the processing of S18 and the unit game is repeated.

[Payout Processing]

Figure 7:
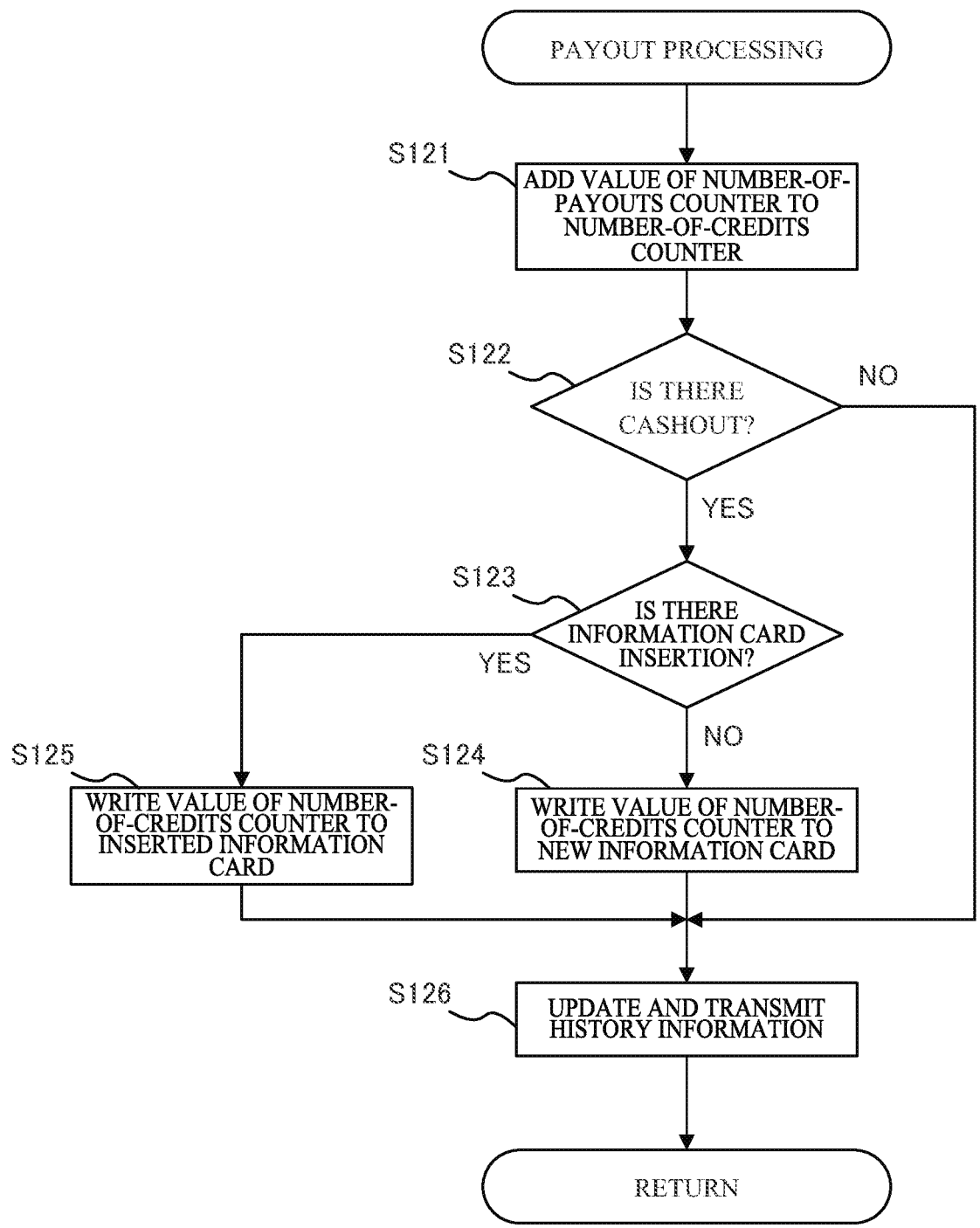
FIG. 7 is a flowchart illustrating a procedure of payout processing of the slot machine according to the embodiment of the present invention.

Next, the payout processing will be described with reference to FIG. 7. First, when entering the payout processing, the main CPU 1071 adds the value of the number-of-payouts counter to the number-of-credits counter (S121), and then determines whether the CASHOUT button is operated (S122).

When the player operates the CASHOUT button, the main CPU 1071 obtains a positive result in step S122, thereby shifting the processing from step S122 to step S123, after which the main CPU 1071 determines whether the information card (member information card or non-member information card) is inserted into the card unit 1741 from the card insertion slot 1730 to play the game.

When the positive result is obtained in step S123, the result indicates that the information card (member information card or non-member information card) owned by the player is being inserted into the card unit 1741, and the main CPU 1071 shifts the processing from step S123 to step S125, after which the main CPU 1071 writes the value of the number-of-credits counter to the information card (member information card or non-member information card) inserted into the card unit 1741 here.

On the other hand, when a negative result is obtained in step S123, the result indicates that the game is played in a state where the information card (member information card or non-member information card) is not inserted into the card unit 1741, and the main CPU 1071 shifts the processing from step S123 to step S124, after which the main CPU 1071 writes the value of the number-of-credits counter here (that is, the balance of the number of credits which is a result of the game) as the balance information to the unused IC card 1500 prepared in advance in the card stacker 1742.

After completing the processing in step S124 or when the negative result is obtained in step S122 described above (that is, when the CASHOUT button is not operated), the main CPU 1071 shifts the processing to step S126, updates history information on the game stored as one game is executed, and transmits the updated history information to the information processing device 500. Then, the processing is returned to the main control processing illustrated in FIG. 6.

Thus, the payout processing is executed by the main CPU 1071, whereby the IC card 1500 (member information card or non-member information card) in which the balance information is written is paid out from the card insertion slot 1730. The player can convert the paid-out IC card 1500 into a currency based upon the balance information written to the IC card 1500 by bringing the paid-out IC card 1500 to a predetermined cashier. When the player continues to play the game, the IC card 1500 is inserted into the card insertion slot 1730 of the other slot machine such that the game in the other slot machine can be played by using the balance information written to the IC card 1500. As a result, the balance information written to the IC card 1500 may be information briefly representing the game value such as the currency converted from the number of credits remaining as a result of the game in the slot machines 1010A, 1010B, and the like, or the number of credits itself, and the like. The information is read by the reader of the cashier 202 (FIG. 1A) and refunded to the player as the currency of a corresponding amount.

In step S126, as illustrated in FIG. 8A, the history information transmitted to the information processing device 500 includes: slot machine identification information for identifying the slot machine which is a generation source of the history information; a date and time of each game; an inserted amount when the currency is inserted at the start of the game; a game result (type of winning, and the like); an inserted amount (when the IC card 1500 is inserted, the inserted amount is an amount read from the IC card 1500, and when cash is inserted, the inserted amount is an amount identified by the bill validator 1022 (FIG. 4)); a balance (a balance of the number-of-credits counter to which the number of credits of the number-of-payouts counter which is a result of the game is added); the number of payouts (an amount paid out by performing writing from the number-of-credits counter to the IC card 1500 (member information card or non-member information card); and information card identification information (for example, information unique to each card such as a number such as "001") for specifying the IC card 1500 (member information card or non-member information card) to which the pieces of history information are written. When the associated IC card 1500 is inserted into the slot machines 1010A, 1010B, and the like before the game is played, since the IC card 1500 is the member card or the non-member card owned by the player in advance, "continuous use 1" is assigned in association with the information card identification information among the history information (for example, FIG. 8B), and then is transmitted. On the other hand, when the IC card 1500 is not inserted thereinto before the game is played, the information of "continuous use 0" meaning the history information which is associated with the non-member information card newly paid out from the card stacker 1742 is assigned to the information card identification information among the history information, and then is transmitted.

Thus, when the information processing device 500 receives the history information from the slot machines 1010A, 1010B, and the like and when the information with respect to the "continuous use" associated with the information card identification information among the received history information is the "continuous use 0", meaning the history information associated with the non-member information card to be newly paid out, that is, meaning that the IC card 1500 is started to be used by a new player (usually a non-member), and starting from the history information, every time the history information imparted with the same information card identification information together with the information of the "continuous use 1" is received thereafter, the pieces of history information are associated with each other as a series of time-series history information (FIG. 9). Accordingly, the non-member information card is newly paid out from the slot machines 1010A, 1010B, and the like where the non-member player plays the game first, after which every time the non-member information card is inserted into the next slot machines 1010A, 1010B, and the like, and the balance of the non-member information card is used for the next game play, these game actions are stored in the database of the information processing device 500 in time series as a series of history information. In FIG. 8A, when a player inserts cash and plays a game in the slot machine (for example, the slot machine 1010A) whose slot machine identification information is "0010", and then the CASHOUT button is operated by the player and the IC card 1500 whose information card identification information "0001" is issued as the non-member information card from the card stacker 1742, the history information transmitted from the slot machine 1010A to the information processing device 500 is represented in response thereto. In FIG. 8B, when the non-member information card (IC card 1500) whose information card identification information is "0001" is inserted from the card insertion slot 1730 and a game is performed in the slot machine (for example, the slot machine 1010B) whose slot machine identification information is "0011", and then the CASHOUT button is operated by the player and the non-member information card (IC card 1500) whose balance information is updated is paid out from the card insertion slot 1730, the history information transmitted from the slot machine 1010B to the information processing device 500 is represented in response thereto. When one such non-member information card is sequentially inserted into the slot machines 1010A, 1010B, and the like, and is continuously used, the pieces of history information transmitted from the respective slot machines 1010A, 1010B, and the like to the information processing device 500 are associated with each other as a series of history information by the information card identification information as illustrated in FIG. 9.

In other words, even in the case of a player who is a non-member, the player can continue to one non-member information card at a casino, such that it becomes possible for the information processing device 500 to grasp game behavior of the player (in which slot machine, how to insert the money and play the game, and information on the game result thereafter and the amount paid out) as if the player were a member.

The main CPU 1071 transmits the pieces of history information to the information processing device 500 in association with the information specifying the slot machine 1010 (for example, the information unique to each slot machine such as a number such as "0010").

Accordingly, in the information processing device 500, it is possible to store the history of games in the respective slot machines 1010A, 1010B, and the like for each IC card 1500 (member information card or non-member information card). When the IC card 1500 is continuously used in a plurality of slot machines 1010, the identification information of the slot machine 1010 and the history information associated with the identification information are stored for each IC card 1500 (FIG. 9), whereby it is possible to grasp the game behavior (information on how many times the game is played in which slot machine 1010 and how much money is inserted thereinto in the game hall) of the player owning the IC card 1500.

[Information Management Processing of Information Management Systems]

Figure 10:
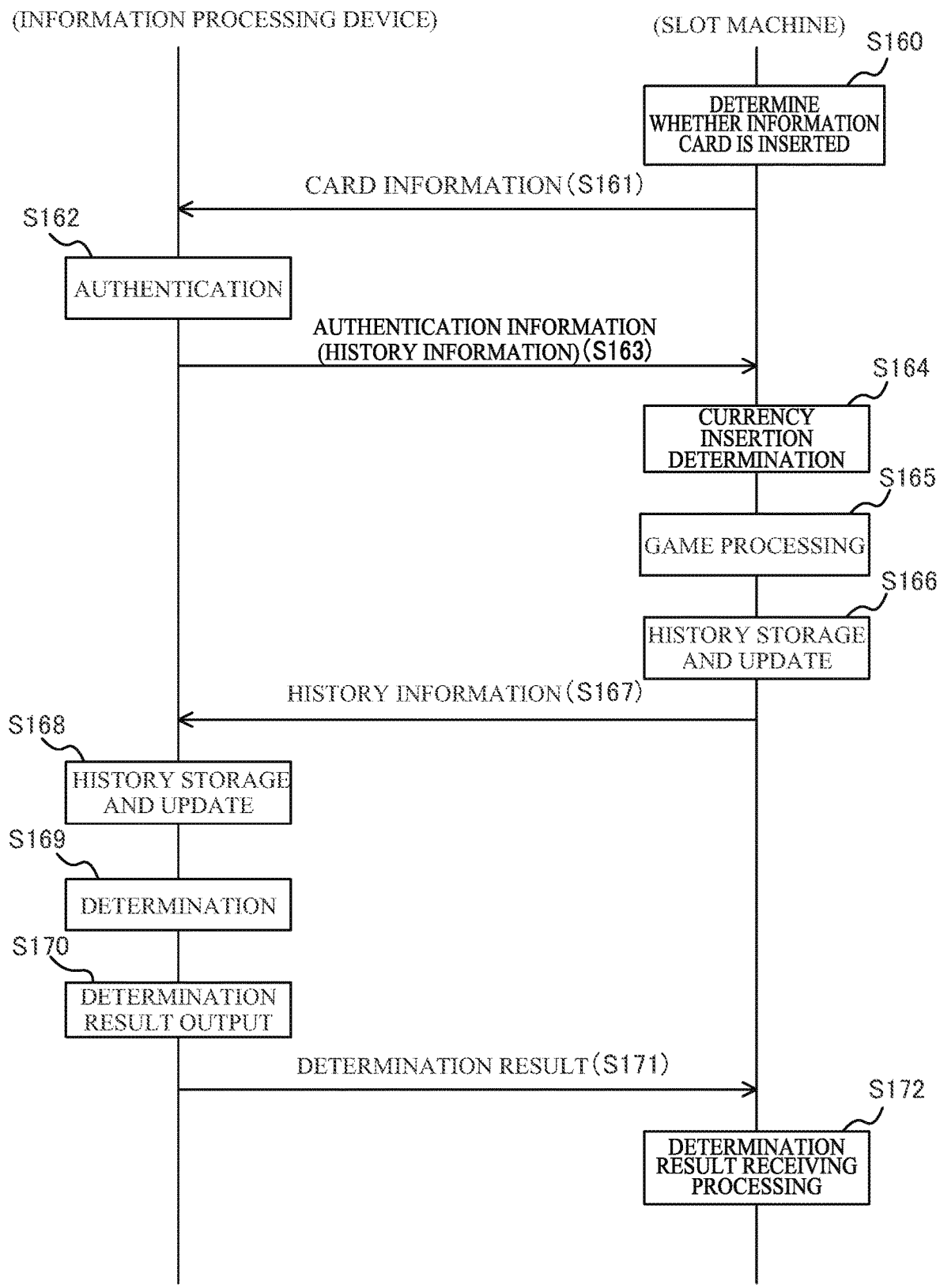
FIG. 10 is a flowchart illustrating a procedure of transmitting and receiving information between the slot machine and the information processing device according to the embodiment of the present invention.

FIG. 10 is a flowchart illustrating a procedure of transmitting and receiving history information between the information processing device 500 and the respective slot machines 1010A, 1010B, and the like in the information management system 100, and a procedure of determination processing based upon the history information.

First, when it is determined that the information card (member information card or non-member information card) is inserted into the slot machines 1010A, 1010B, and the like (S160), the slot machines 1010A, 1010B, and the like read card information (information card identification information (card number), and the like) from the inserted information card, and then transmit the card information to the information processing device 500 (S161). Here, when the slot machines 1010A, 1010B, and the like capture a face image of a player by the human body detection camera 1713 (FIG. 5), the image data are transmitted to the information processing device 500 together with the card information. Without being limited to the face image, various kinds of human body information can be used as long as the image data are the human body information such as fingerprint information, and the like.

The information processing device 500 performs authentication processing based upon the card information and the image data transmitted from the slot machines 1010A, 1010B, and the like (S162). Specifically, it is determined whether the card is a member-registered card (member information card) or the non-member information card which is not registered as a member, based upon the information card identification information (information card number), and based upon the image data, authentication based upon the registration information of the member information card is completed, that is, when the face image is already registered, image authentication is performed to determine whether a player is a regular registered member.

When it is determined that the player is the regular registered member by the above-described authentication processing, or when the player is not the registered member but the information card number coincides with the card number of the card which is legitimately prepared (IC card 1500 prepared in the card stacker 1742 of the respective slot machines 1010A, 1010B, and the like), it can be determined that the card is a regular non-member information card.

When the above-described authentication processing is completed, an authentication result is returned to the slot machine (either one of the slot machines 1010A, 1010B, and the like) which is a transmission source from which the card information is transmitted here as authentication information (S163).

The slot machines 1010A, 1010B, and the like receiving the authentication information allow the player to play the game based upon the fact that the inserted information card is a regular card.

When the game value (currency, and the like) is inserted (S164), the authenticity determination of the inserted currency and the amount thereof are read and stored in the RAM 1073 (FIG. 5) of the slot machines 1010A, 1010B, and the like. When the IC card 1500 (member information card or non-member information card) is inserted and the currency is inserted, the number of credits by the inserted currency is added to the number of credits read from the IC card 1500 for the game play. When the IC card 1500 is not inserted, the number of credits by the inserted currency is used for the game play.

Accordingly, the game processing is executed by the number of credits based upon the inserted IC card 1500 and the inserted currency (S165). The result of the game processing (type of winning, dividend, and the like.) is sequentially stored in the RAM 1073 of the slot machine (either one of the slot machines 1010A, 1010B, and the like) as the history information in association with the information card identification information (information card number).

When one game is finished, the history information stored in the slot machine is updated (S166) and the updated history information is transmitted to the information processing device 500 (S167). S166 and S167 are performed by the processing of step S126 of the payout processing illustrated in FIG. 7. When the game is started in a state where the IC card 1500 (member information card or non-member information card) is not inserted into each of the slot machines 1010A, 1010B, and the like, a history from the game until, thereafter, the CASHOUT button is operated and the new IC card 1500 is paid out is transmitted as a series of history information to the information processing device 500 and updated (stored). Since the series of history information is the history of the game performed in a state where the IC card 1500 is not inserted, the series of history information is associated with the information card identification information (information card number) of the IC card 1500 to be newly issued here as the non-member information card. On the other hand, when the IC card 1500 (member information card or non-member information card) is inserted and the game is started, after the IC card 1500 is inserted, the history information until the IC card 1500 is paid out is associated with the information card identification information of the IC card 1500 as a series of history information in the information processing device 500 (S168 described later). The association may be performed on a slot machine side and may be transmitted from the slot machine to the information processing device 500 at a predetermined timing. The series of history information may not be stored in the slot machines 1010A, 1010B, and the like, but may be stored only in the information processing device 500.

As described above, in a case where the information processing device 500 receives the history information transmitted from the slot machines 1010A, 1010B, and the like in association with the IC card 1500, when history information corresponding to the information card identification information (information card number) associated with the history information is already stored in the database, the information processing device 500 causes the pieces of history information to be associated with each other, and then the associated history information is stored in the database (S168). Since the association of the history information is the association in which the IC card 500 is used by the same player, the history information in which the information representing the "continuous use" associated with the information card identification information (information card number) of the non-member information card is "0" is first stored in the database, after which the history information in which the information representing the "continuous use" is "1" is stored in the database in time series as a series of history information (refer to FIG. 9). That is, as long as the IC card 1500 is continuously used by the same player, even when the player plays the game while moving to the respective slot machines 1010A, 1010B, and the like, the pieces of history information of the games are associated with each other as a series of history information corresponding to the information card identification information (information card number) of the IC card 1500 in the database of the information processing device 500. In a case where the image data of face images are associated with each other, only when the same person is identified by the authentication of the face image by the image data, the pieces of history information of the games are associated with each other as a series of history information.

Regardless of the information representing the "continuous use" (whether the continuous use is "0" or "1"), the pieces of history information associated with the member information card are associated with each other as a series of history information corresponding to the same information card identification information (information card identification information which is registered corresponding to a player registered as a member). In the case of history information of the member, when the face image is registered as member information and when the image data of the face image are transmitted corresponding to the history information from the slot machines 1010A, 1010B, and the like, it is also possible to perform the authentication of whether a player is a member by using the face image.

As described above, when the history information associated with the IC card 1500 (member information card or non-member information card) is stored in the information processing device 500, the information processing device 500 performs determination based upon, for example, game behavior such as a fraudulent act such as money laundering, and the like by a player based upon the history information (S169). The determination processing will be described later.

As a result of the determination, for example, when a fraudulent act is detected, in the information processing device 500, a warning is displayed (S170), and the determination result is transmitted from the information processing device 500 to the slot machines 1010A, 1010B, and the like into which the IC card 1500 related to the warning is inserted here (S171). Thus, by performing a predetermined warning display in the information processing device 500, a person in charge of management of the game hall can take a countermeasure against the warning. For example, some kinds of warning can be given to the player who is detected as the person performing the fraudulent act. The slot machines 1010A, 1010B, and the like which receive the warning information can directly transmit the warning by issuing the warning in the slot machines 1010A, 1010B, and the like, and by presenting the display directly to the corresponding player.

[Operation of Embodiment]

Figure 11A:
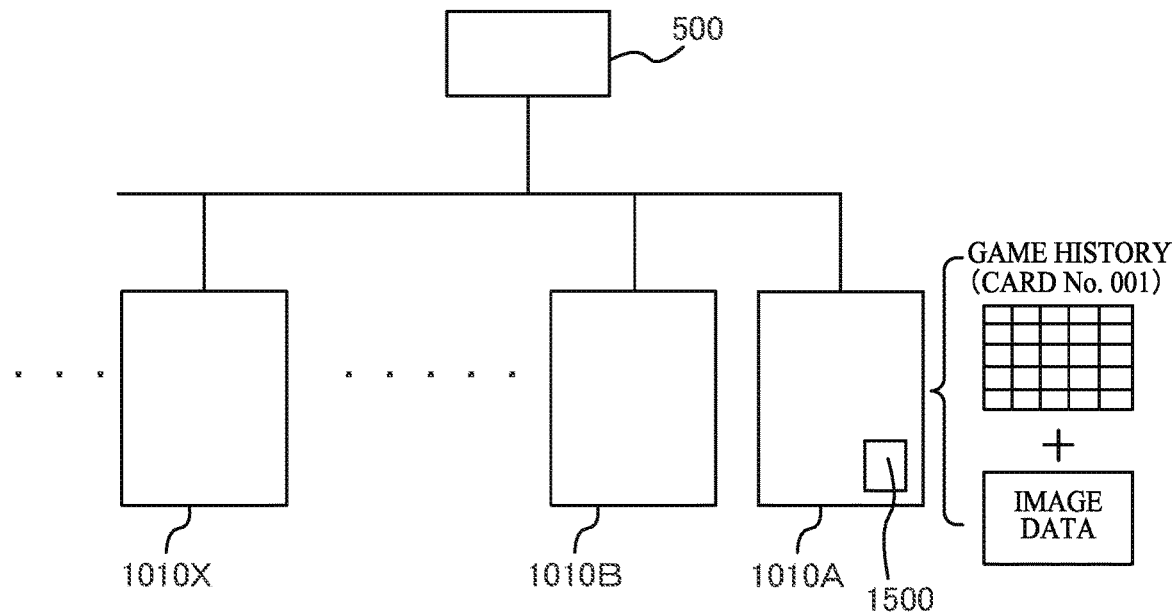
FIGS. 11A and 11B are schematic diagrams illustrating an operation of the information management system according to the embodiment of the present invention.
Figure 11B:
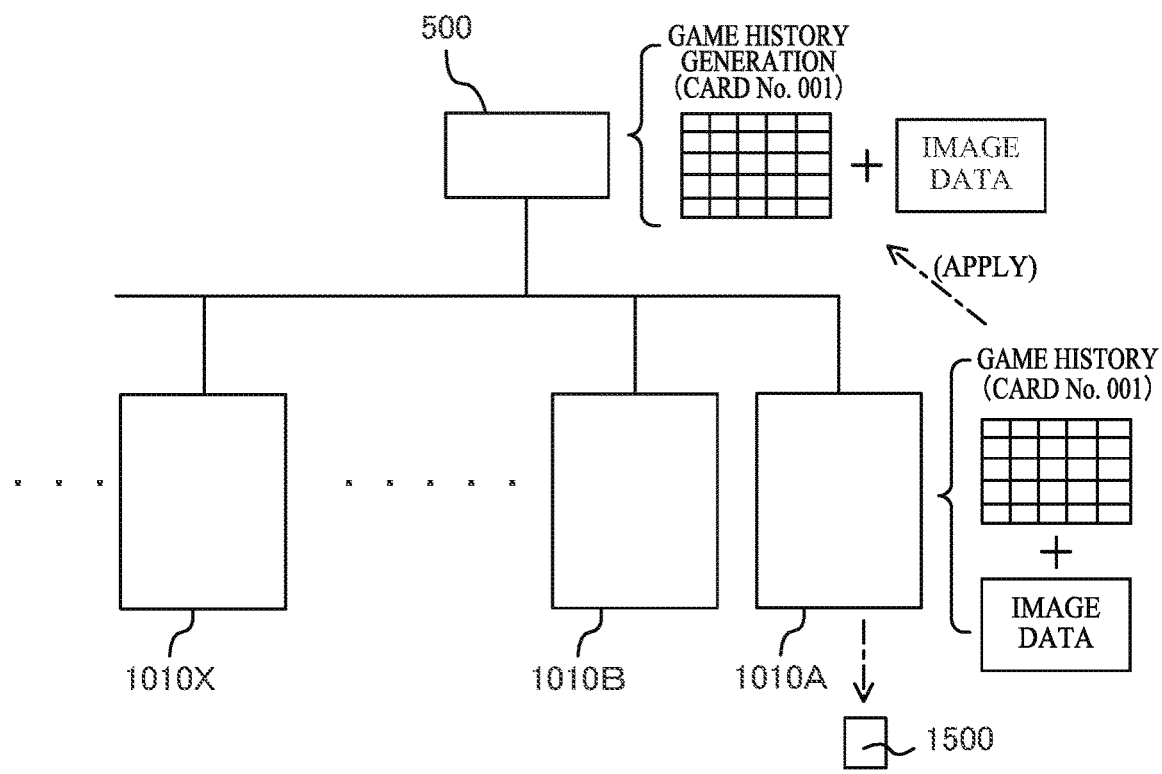

In the above-described configuration, as illustrated in FIG. 11A, for example, when a player who is not registered as a member inserts a currency into the slot machine 1010A and starts a game, the slot machine 1010A stores a history of the game (inserted amount, game result, credit balance, and the like) as a game history (history information). The pieces of history information such as the inserted amount, the game result, the dividend amount, the time of occurrence thereof, and the like are transmitted to the information processing device 500 every time one game is finished, and the history information is also stored (updated) in the information processing device 500. When the player operates the CASHOUT button, a face image is captured and stored as image data in the slot machine 1010A in association with the game history (history information) stored here; as illustrated in FIG. 11B, the number of credits remaining in the number-of-credits counter or a result obtained by being converted into a currency is written as balance information to the unused IC card 1500 prepared in the card stacker 1742; and the IC card 1500 is paid out as the non-member information card from the card insertion slot 1730. The game history (history information) corresponding to the balance information written to the IC card 1500 and the image data of the face image are associated with the information card identification information (information card number) of the IC card 1500, transmitted to the information processing device 500, and stored in the database 560 of the information processing device 500. The history information is not limited to a case where the history information is stored in both the slot machine 1010A and the information processing device 500, and the history information may be only stored in the information processing device 500.

Figure 12A:
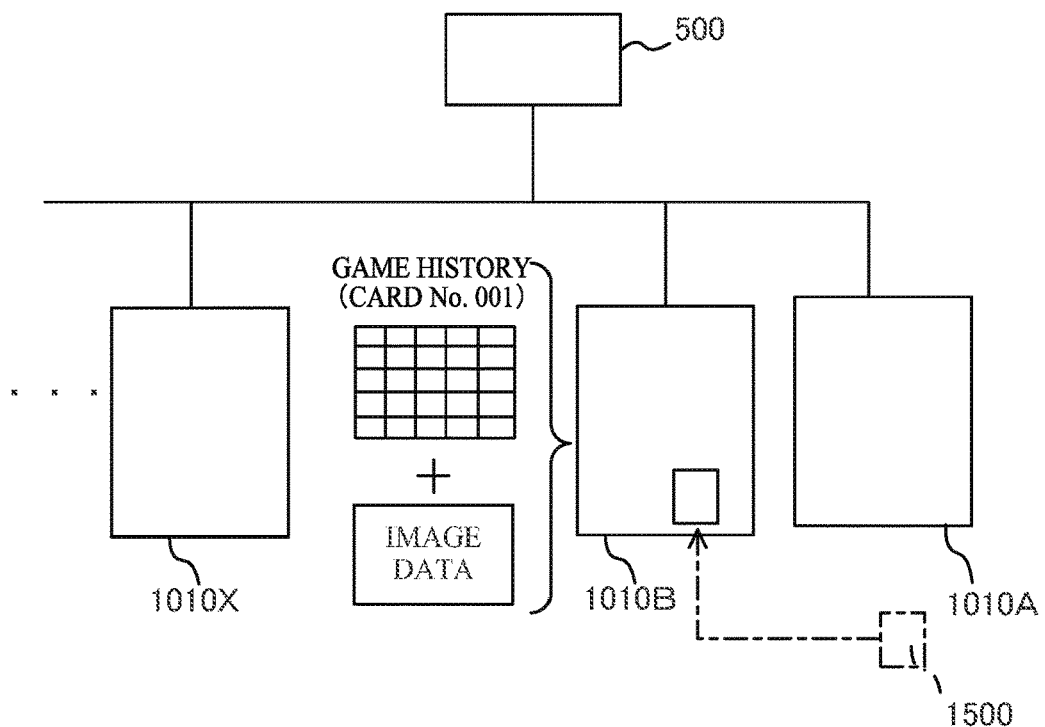
FIGS. 12A and 12B are schematic diagrams illustrating the operation of the information management system according to an embodiment of the present invention.

The player owning the IC card 1500 paid out from the slot machine 1010A continuously inserts the IC card 1500 into another slot machine 1010B as illustrated in FIG. 12A, and when the game is started in the slot machine 1010B, the game history is stored in association with the information card identification information (information card number) of the IC card 1500 inserted here according to the progress of the game in the slot machine 1010B. Every time the player finishes one game, the slot machine 1010B transmits the game result (history information) to the information processing device 500, and the history information is stored in the slot machine 1010B and the information processing device 500. When the player finishes the game and operates the CASHOUT button, the face image of the player is captured, and the face image thereof is stored in the slot machine 1010B and the information processing device 500 as the image data associated with the information card identification information (information card number) of the IC card 1500 inserted thereinto here. Next, the balance information remaining in the number-of-credits counter is written to the inserted IC card 1500, thereby updating the balance information.

Figure 12B:
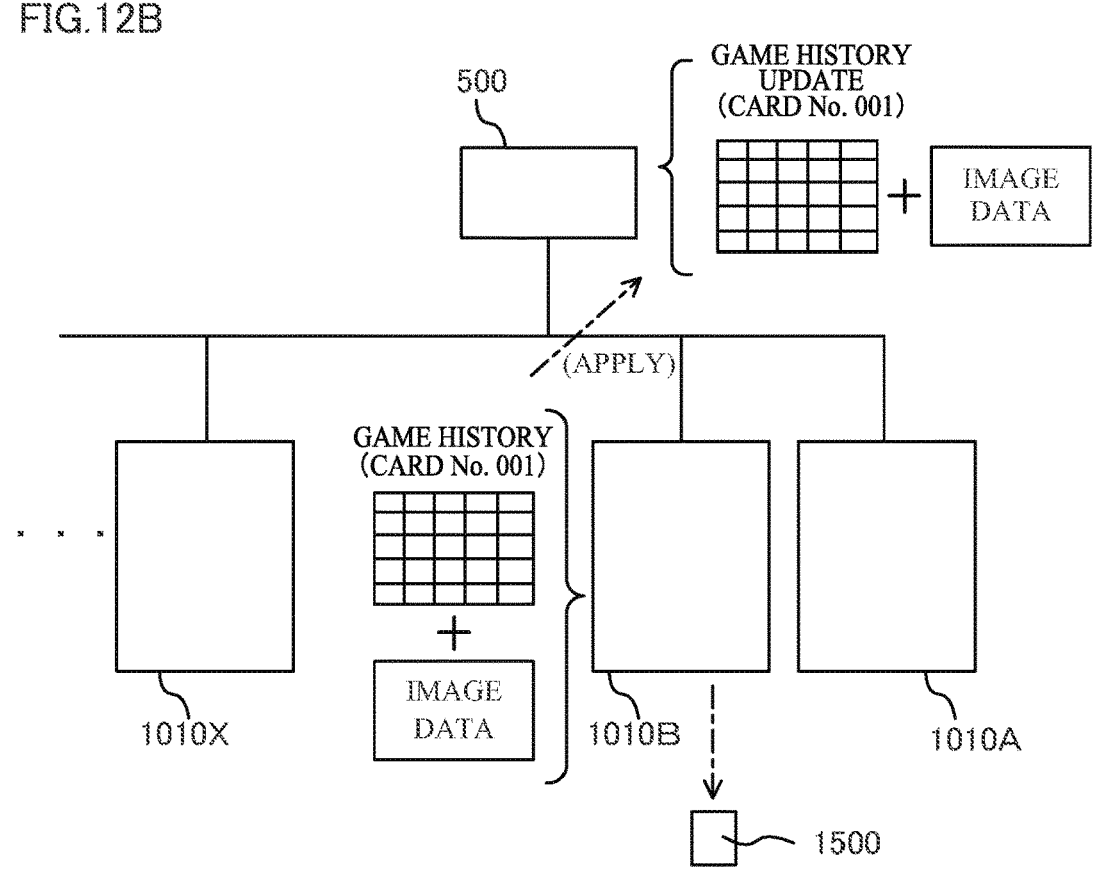

The game history (history information) corresponding to the updated balance information is stored in the database 560 as the history information associated with the information card identification information in the information processing device 500 (FIG. 12B).

As described above, with respect to the non-member information card for which the IC card 1500 is issued, the game histories thereof are sequentially stored in the database 560 of the information processing device 500 for the plurality of slot machines 1010A, 1010B, and the like, thereby making it possible to grasp the game behavior of the same player even for the non-member based upon the history information thereof, whereby, for example, it is possible not only to determine the fraudulent act such as money laundering and the dependency on the game, but also to take a countermeasure such as outputting a warning, and the like.

While the embodiment of the present invention is described, the embodiment thereof is merely described with a specific example and does not particularly limit the present invention, and a specific configuration of each device, and the like can be appropriately changed in design. The effects described in the embodiment of the present invention are those merely enumerating the most suitable effects resulting from the present invention, and the effects of the present invention are not limited to those described in embodiment of the present invention.

In the above-described detailed descriptions, a characteristic part is mainly described so as to more easily understand the present invention. The present invention is not limited to the embodiment described in the detailed descriptions, but can be also applied to other embodiments and the scope of application thereof is varied. The terminology and the phase used in the present specification are used to accurately describe the present invention, and are not used to limit the interpretation of the present invention. It may be easy for those skilled in the art to reconsider other configurations, systems, methods, and the like included in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the literatures already disclosed are interpreted with due consideration.

The above-described detailed descriptions include the processing executed by a computer. The above descriptions and expressions are intended to help those skilled in the art to understand most efficiently. In the present specification, each step used to derive one result should be understood as processing that is not self-contradictory. In each step, transmission and reception, recording, and the like of an electrical or magnetic signal are performed. In the processing in each step, while such a signal is represented with bits, values, symbols, characters, terms, numbers, and the like, it should be noted that these are merely used for the convenience of the descriptions. While the processing in each step may be described with expressions common to human behavior, the processing described in the present specification is basically performed by various devices. Other configurations required for performing each step become obvious from the above descriptions.

PARTS LIST

100 information management system
201 member information card issuing device
500 information processing device
560 database
1010A, 1010B slot machine
1500 IC card
1700 PTS terminal

What is claimed is:

1. An information management system, comprising:
a plurality of gaming machines each having unique gaming machine identification information; and
an information processing device configured to communicate with the plurality of gaming machines and including a first, member database, which includes personal information for each of a plurality of pre-registered members, and a second, transaction history database;
wherein each of the gaming machines includes
a card stacker containing a plurality of to-be-issued non-member information cards, which non-member information cards each store unique, non-member identification information data not associated with personal information of a player to whom one of the to-be-issued non-member information cards will be issued, and
a card unit configured and arranged within the gaming machine and relative to the card stacker to receive and hold therein information cards inserted into the gaming machine from the exterior of the gaming machine as well as to-be-issued non-member information cards received from the card stacker, said information cards inserted into the gaming machine from the exterior of the gaming machine including member information cards and previously-issued non-member information cards, the member information cards each storing unique, member identification information data that associates a given member information card with one of the pre-registered members included in the first, member database and the previously-issued non-member information cards each storing unique, non-member identification information data not associated with personal information of a player to whom the previously-issued non-member information card has been issued,
the card unit further being configured to read the unique, identification information data stored in an information card held therein and to eject the information card held therein in response to a card-eject command, the information card held in the card unit being one of said information cards inserted into the gaming machine from the exterior of the gaming machine or one of said to-be-issued non-member information cards received from the card stacker;
each of the gaming machines further including a camera arranged to acquire body image data of a player at the gaming machine, the camera being controlled to acquire the body image data prior to the information card held in the card unit being ejected; and
a transmission part configured to transmit to the information processing device in association with each other the gaming machine identification information, the unique identification information data stored in the information card held in the card unit, and the acquired body image data; and wherein the information processing device is configured to determine, based on the unique identification information data of one of the non-member information cards held in the card unit and transmitted by the transmission part, whether the unique identification information data of the non-member information card held in the card unit and associated acquired body image data have been stored previously in the second, transaction history database and, if so, to determine whether newly received acquired body image data matches the previously stored acquired body image data; and if the newly received acquired body image data, which is associated with the unique identification information data of said one of the non-member information cards held in the card unit, matches the previously stored acquired body image data, then storing gaming-machine transaction data in the second, transaction history database, the gaming-machine transaction data including, in association with the unique identification information data of said one of the non-member information cards held in the card unit and the unique gaming machine identification information of the gaming machine in which said one of the non-member information cards is held, gaming-value-addition amounts or payout amounts.

2. The information management system according to claim 1, wherein each of the gaming machines is further configured to execute a card-writing process upon execution of a cashout operation, said card-writing process comprising
executing a determination step in which it is checked to see whether either a member information card or a non-member information has been inserted into the gaming machine from the exterior of the gaming machine, and a) if a result of the determination step is positive, writing the value of a number-of-credits counter to the information card that has been inserted into the gaming machine, and b) if a result of the determination step is negative, writing the value of the number-of-credits counter to one of the to-be-issued information cards in the card stacker.

3. The information management system according to claim 1, wherein the gaming machine includes an indicator that signals the number of to-be-issued information cards remaining in the card stacker.

4. The information management system according to claim 1, wherein the information processing device is configured to determine, in connection with one of the member information cards held in the card unit, whether body image data has been previously stored in the first, member database in association with the unique identification information data of said one of the member information cards held in the card unit and, if so, to authenticate that the player at the gaming machine is a member by determining whether newly received acquired body image data matches the body image data that has been previously stored in the first, member database in association with the unique identification information data of said one of the member information cards held in the card unit.

5. The information management system according to claim 1, wherein each of the gaming machines includes a currency addition mechanism configured to permit gaming value to be added to the gaming machine in the form of cash, and wherein the gaming machine is further configured such that, if the gaming machine is played using cash, remaining-balance information is written to one of the to-be-issued non-member information cards in response to a cashout operation.

6. The information management system according to claim 1, wherein the gaming-machine transaction data includes a continuous-use code that identifies whether said one of the non-member information cards held in the card unit is a to-be-issued non-member card or a previously-issued non-member information card.

* * * * *